(12) United States Patent
Biran et al.

(10) Patent No.: US 11,902,499 B2
(45) Date of Patent: Feb. 13, 2024

(54) SIMULATION SIGHTING BINOCULARS, AND SIMULATION SYSTEM AND METHODS

(71) Applicant: Airbus Defence and Space SAS, Toulouse (FR)

(72) Inventors: Hervé Biran, Elancourt (FR); Christophe Lartillot, Elancourt (FR)

(73) Assignee: Airbus Defence and Space SAS, Toulouse (FR)

( * ) Notice: Subject to any disclaimer, the term of this patent is extended or adjusted under 35 U.S.C. 154(b) by 57 days.

(21) Appl. No.: 17/782,386

(22) PCT Filed: Nov. 26, 2020

(86) PCT No.: PCT/EP2020/083548
§ 371 (c)(1),
(2) Date: Jun. 3, 2022

(87) PCT Pub. No.: WO2021/110538
PCT Pub. Date: Jun. 10, 2021

(65) Prior Publication Data
US 2023/0009683 A1    Jan. 12, 2023

(30) Foreign Application Priority Data
Dec. 5, 2019 (FR) ...................................... 1913797

(51) Int. Cl.
*H04N 13/344* (2018.01)
*H04N 13/293* (2018.01)
*G06T 19/00* (2011.01)

(52) U.S. Cl.
CPC ......... *H04N 13/344* (2018.05); *G06T 19/006* (2013.01); *H04N 13/293* (2018.05)

(58) Field of Classification Search
CPC ................ H04N 13/344; H04N 13/293; G06T 19/006
See application file for complete search history.

(56) References Cited

U.S. PATENT DOCUMENTS 10,030,931 B1 * 7/2018 Black ...................... F41A 33/00
10,032,386 B2 7/2018 Biran et al.
(Continued)

FOREIGN PATENT DOCUMENTS

ER    3007161 A1    12/2014
ES    2300204 A1    6/2008

OTHER PUBLICATIONS

T. Oskiper, "Augmented Reality Binoculars," in IEEE Transactions on Visualization and Computer Graphics, May 1, 2015, vol. 21, pp. 611-623, (Year: 2015).*

(Continued)

*Primary Examiner* — Terrell M Robinson
(74) *Attorney, Agent, or Firm* — Greer, Burns & Crain, Ltd.

(57) ABSTRACT

Simulation sighting binoculars include a camera, a screen, a pair of lenses which are arranged to face the screen, and electronic circuitry which is configured to: obtain a video frame from the camera; transmit, to a simulation platform, geolocation information and orientation information for the camera; receive simulation graphical elements and spatial positioning information for corresponding virtual objects; carry out a two-dimensional rendering of the virtual objects, in order to display them in a projection window E2; superimpose the two-dimensional rendering of the virtual objects in the projection window E2 and the video frame in a projection window E3; obtain a mixed-reality stereoscopic image using a pair of virtual cameras reproducing binocular vision which is adapted to the pair of lenses; and carry out, on the screen, a right-eye and left-eye display of the obtained mixed-reality stereoscopic image.

16 Claims, 9 Drawing Sheets

(56) References Cited

U.S. PATENT DOCUMENTS

| | | | | |
|---|---|---|---|---|
| 2012/0019522 A1* | 1/2012 | Lawrence | ............... | G06T 17/00 |
| | | | | 345/419 |
| 2013/0050432 A1 | 2/2013 | Perez et al. | | |
| 2014/0221090 A1* | 8/2014 | Mutschler | ............. | A63F 13/211 |
| | | | | 463/31 |
| 2016/0314703 A1* | 10/2016 | Biran | ..................... | G09B 9/003 |
| 2019/0243131 A1* | 8/2019 | Yi | ...................... | G02B 27/0093 |
| 2019/0361797 A1* | 11/2019 | Yerli | ................... | G06F 11/3664 |
| 2021/0142530 A1* | 5/2021 | Samarasekera | ......... | G06T 11/60 |

OTHER PUBLICATIONS

International Search Report; priority document.

\* cited by examiner

SIMULATION SIGHTING BINOCULARS, AND SIMULATION SYSTEM AND METHODS

CROSS-REFERENCES TO RELATED APPLICATIONS

This application claims the benefit of the International Application No. PCT/EP2020/083548, filed on Nov. 26, 2020, and of the French patent application No. 1913797 filed on Dec. 5, 2019, the entire disclosures of which are incorporated herein by way of reference.

FIELD OF THE INVENTION

The present invention relates to the simulation, on real terrain, of virtual military situations by virtue of mixed-reality sighting glasses.

BACKGROUND OF THE INVENTION

Fire support procedures (or "Call For Fire") are military operations making possible a precise use of firepower, in rapid timeframes and in synchronization with ground teams, to support troops which are close to the enemy and avoid friendly fire. During these operations, officers of the armed forces, deployed in the theater of operation, are responsible for coordinating any type of strike, for example air strikes, by providing, among other things, information on a target to be hit on its position and on its immediate environment. Reference is then made to FACs (Forward Air Controllers) in old NATO (North Atlantic Treaty Organization) terminology exclusively designating air fire support, JFOs (Joint Fire Observers) for the coordination of artillery fire, or JTACs (Joint Terminal Attack Controllers) according to American terminology and new NATO terminology, capable of coordinating any type of air, land or sea fire support. In the rest of the document, reference will be made to a fire support controller to designate either an FAC, a JFO or a JTAC.

To make it possible to train fire support controllers without risk, systems for reconstructing, by means of a virtual environment, battlefield operational contexts have been developed. Mention may, for example, be made of the system described in patent document FR 3 007 161 A1.

These are simulation systems which are installed indoors in dedicated infrastructures. These simulation systems specifically require substantial computer equipment to generate and display virtual scenes. Displaying them also typically requires large screens. These simulation systems therefore do not make it possible for fire support controllers to train in real light, weather and terrain configuration conditions.

It is desirable to completely or partially overcome the aforementioned disadvantage of the prior art. There is therefore a need for a solution aiming to provide a simulation environment which makes it possible for fire support controllers to train in more realistic conditions. There is also a need for a solution the portability of which makes easy and rapid deployment possible to take into account the configuration of a new training ground. There is also a need to provide a solution which makes it possible to carry out realistic training in a mode for interaction and collaboration between various actors, such as, for example, for fire support training scenarios. There is also a need for a solution which makes it possible to maintain this realism in zoom conditions.

SUMMARY OF THE INVENTION

To this end, simulation sighting binoculars are proposed comprising a camera, a screen, a pair of lenses which are arranged to face the screen, and electronic circuitry which is configured to: obtain a video frame from the camera, the video frame being intended to be displayed by the simulation sighting binoculars in a projection window E3; obtain geolocation information for the simulation sighting binoculars and orientation information for the camera; transmit the geolocation and orientation information to a simulation platform; receive simulation graphical elements and spatial positioning information for three-dimensional virtual objects corresponding to the simulation graphical elements; carry out a two-dimensional rendering of the virtual objects depending on the positioning information, in order to display the virtual objects in a projection window E2, and, when a magnification factor is to be applied, keep the dimensions of the projection window E2 fixed and adjust the field of view of the two-dimensional rendering according to the magnification factor; superimpose, in a virtual scene which is local to the simulation sighting binoculars, the two-dimensional rendering of the virtual objects in the projection window E2 and the video frames in the projection window E3, the projection window E3 being placed in a plane which is farther from the simulation sighting binoculars than the one where the projection window E2 is placed in the field of view of the simulation sighting binoculars, the simulation sighting binoculars having a line of sight which passes through the center of the projection windows E2 and E3, and, when a magnification factor is to be applied, adjust the dimensions of the projection window E3 according to the magnification factor; obtain a mixed-reality stereoscopic image from superimposing the planes using a pair of virtual cameras reproducing binocular vision which is adapted to the pair of lenses; and carry out, on the screen, a right-eye and left-eye display of the obtained mixed-reality stereoscopic image. Thus, by virtue of the real scene captured by the camera, fire support controllers are immersed in a more realistic simulation environment. By virtue of the advantageous processing of the fields of view and the projection windows in the case of a magnification factor to be applied, the realism of immersion is preserved in the case of zooming. Also, the remote processing of the graphical elements (relating to the virtual objects linked to the training scenario) in the simulation platform makes it possible to limit the need for internal processing resources of the simulation sighting binoculars, which facilitates the integration of the simulation sighting binoculars and their adaptability to new training grounds.

According to one particular embodiment, the electronic circuitry is configured to further superimpose, in the virtual scene which is local to the simulation sighting binoculars, a reticle in a projection window E1 placed in a plane which is closer to the simulation sighting binoculars than the one where the projection window E2 is placed in the field of view of the simulation sighting binoculars, the line of sight also passing through the center of the projection window E1, and, when a magnification factor is to be applied, adjust the dimensions of the projection window E1 according to the magnification factor. Thus, the realism of the simulation sighting binoculars is enhanced.

According to one particular embodiment, the electronic circuitry is configured to further superimpose, in the virtual scene which is local to the simulation sighting binoculars, additional information in a projection window E0 placed in a plane which is closer to the simulation sighting binoculars than the one where the projection window E1 is placed in the field of view of the simulation sighting binoculars, the projection window E0 not being sensitive to the magnification factor. Thus, the simulation sighting binoculars can display information which is consistent with real electronic displays of sighting binoculars, with a realistic stereoscopic effect, independently of any potentially applied magnification factor.

According to one particular embodiment, the screen, the camera and the electronic circuitry are provided by a smart mobile telephone joined to a housing comprising the pair of lenses, which are arranged to face the screen of the smart mobile telephone. Thus, deploying the equipment which is necessary for the simulation is easy.

According to one particular embodiment, the simulation sighting binoculars further comprise a sensor of inertial measurement unit type, and the electronic circuitry implements a Simultaneous Localization and Mapping (SLAM) algorithm, and the orientation information for the camera is provided by the Simultaneous Localization and Mapping (SLAM) algorithm, except when the Simultaneous Localization and Mapping (SLAM) algorithm stalls, in which case the orientation information for the camera is provided by the sensor of inertial measurement unit type. Thus, the sighting binoculars use the orientation information from the SLAM algorithm, which is considered to be more accurate, as soon as possible, and use the orientation information from the sensor of inertial measurement unit type in degraded mode.

According to one particular embodiment, the geolocation information for the simulation sighting binoculars is supplied by the Simultaneous Localization and Mapping (SLAM) algorithm, except when the Simultaneous Localization and Mapping (SLAM) algorithm stalls, in which case the geolocation information for the simulation sighting binoculars is provided by a Global Positioning System (GPS) receiver integrated into the simulation sighting binoculars. Thus, the sighting binoculars use the geolocation information from the SLAM algorithm, which is considered to be more accurate, as soon as possible, and use the geolocation information from the GPS receiver in degraded mode.

According to one particular embodiment, the Simultaneous Localization and Mapping (SLAM) algorithm provides a confidence index associated with the orientation information for the camera, for each video frame captured by the camera, and the electronic circuitry is configured to determine whether the Simultaneous Localization and Mapping (SLAM) algorithm has stalled according to the value of the confidence index. Thus, it is easy to ascertain whether or not the information provided by the SLAM algorithm is reliable.

According to one particular embodiment, when the Simultaneous Localization and Mapping (SLAM) algorithm has stalled, the electronic circuitry corrects the updated orientation information from the sensor of inertial measurement unit (IMU) type in the following way:

$$Q_{abs}(t) = Q_{abs}(t0) * Q_{imu-1}(t0) * Q_{imu}(t)$$

where:
Qabs(t) represents the corrected orientation information;
Qabs(t0) represents the absolute orientation information, that is to say, originating from the SLAM algorithm, before stalling;
Qimu(t) represents the updated orientation information from the sensor of inertial measurement unit (IMU) type; and
Qimu(t0) represents the orientation information from the sensor of inertial measurement unit (IMU) type before stalling of the SLAM algorithm Thus, the aforementioned degraded mode is easily implemented.

According to one particular embodiment, the electronic circuitry corrects the orientation information provided by the Simultaneous Localization and Mapping (SLAM) algorithm according to deviations determined during calibration operations. Thus, it is possible to receive information from the SLAM algorithm in a relative manner.

According to one particular embodiment, the electronic circuitry is configured to, during the calibration operations: receive simulation graphical elements corresponding to a calibration virtual object and spatial positioning information for the calibration virtual object; carry out, on the screen, a right-eye and left-eye stereoscopic display of a mixed-reality stereoscopic image including the calibration virtual object; obtain first orientation information for the camera when a first press on a calibration button of the simulation sighting binoculars is carried out; obtain second orientation information for the camera when a second press on the calibration button of the simulation sighting binoculars is carried out; and compare the first orientation information and the second orientation information and deduce therefrom corresponding orientation and altitude information deviations. Thus, the calibration operations are easily carried out.

A simulation system is also proposed comprising a simulation platform, as well as simulation sighting binoculars according to any one of the above-presented embodiments, the simulation platform comprising electronic circuitry configured to place, according to a training scenario, virtual objects in a digital terrain model modeling a training ground where the simulation sighting binoculars are intended to be used, and to transmit or cause to be transmitted, to the simulation sighting binoculars, the simulation graphical elements according to the geolocation information for the simulation sighting binoculars and the orientation information for the camera which is transmitted by the simulation sighting binoculars. Thus, the remote processing of the graphical elements (relating to the virtual objects and to the digital terrain model which are linked to the training scenario) in the simulation platform makes it possible to limit the need for internal processing resources of the simulation sighting binoculars, which facilitates the integration of the simulation sighting binoculars and their adaptability to new training grounds.

According to one particular embodiment, the simulation platform transmits or causes to be transmitted, to the simulation sighting binoculars, the simulation graphical elements asynchronously with respect to the geolocation information for the simulation sighting binoculars and to the orientation information for the camera, the simulation sighting binoculars carry out interpolations of the positioning of the virtual objects and a first processing unit of the simulation system, which is remote from the simulation sighting binoculars, carries out, on behalf of the simulation sighting binoculars, a positioning readjustment by virtue of the digital terrain model. Thus, the remote processing linked to the positioning readjustment by virtue of the digital terrain model, which is potentially costly in terms of processing resources, makes it possible to limit the need for internal processing resources of the simulation sighting binoculars.

According to one particular embodiment, when the simulation sighting binoculars activate a telemetry reading, a second processing unit of the simulation system, which is remote from the simulation sighting binoculars, carries out a distance calculation with respect to a target sighted by the simulation sighting binoculars using a ray tracing method in a virtual scene including the virtual objects and the digital terrain model. Note that the second processing unit can also be the first processing unit. Thus, the remote processing linked to the telemetry reading, which is potentially costly in terms of processing resources, makes it possible to limit the need for internal processing resources of the simulation sighting binoculars.

A simulation method is also proposed, implemented by electronic circuitry of simulation sighting binoculars further comprising a camera, a screen and a pair of lenses which are arranged to face the screen, the method comprising the following steps: obtaining a video frame from the camera, the video frame being intended to be displayed by the simulation sighting binoculars in a projection window E3; obtaining geolocation information for the simulation sighting binoculars and orientation information for the camera; transmitting the geolocation and orientation information to a simulation platform; receiving simulation graphical elements and spatial positioning information for three-dimensional virtual objects corresponding to the simulation graphical elements; carrying out a two-dimensional rendering of the virtual objects depending on the positioning information, in order to display the virtual objects in a projection window E2, and, when a magnification factor is to be applied, keeping the dimensions of the projection window E2 fixed and adjusting the field of view of the two-dimensional rendering according to the magnification factor; superimposing, in a virtual scene which is local to the simulation sighting binoculars, the two-dimensional rendering of the virtual objects in the projection window E2 and the video frames in the projection window E3, the projection window E3 being placed in a plane which is farther from the simulation sighting binoculars than the one where the projection window E2 is placed in the field of view of the simulation sighting binoculars, the simulation sighting binoculars having a line of sight which passes through the center of the projection windows E2 and E3, and, when a magnification factor is to be applied, adjusting the dimensions of the projection window E3 according to the magnification factor; obtaining a mixed-reality stereoscopic image from superimposing the planes using a pair of virtual cameras reproducing binocular vision which is adapted to the pair of lenses; and carrying out, on the screen, a right-eye and left-eye display of the obtained mixed-reality stereoscopic image.

A computer program product is also proposed, comprising instructions causing a processor to execute the aforementioned method, in any one of its embodiments, when the instructions are executed by the processor. An information storage medium is also proposed on which such a computer program product is stored.

A simulation method is also proposed, implemented by a simulation system including simulation sighting binoculars implementing the simulation method defined above in any one of its embodiments and a simulation platform comprising electronic circuitry implementing the following steps: placing, according to a training scenario, virtual objects in a three-dimensional digital terrain model modeling a training ground where the simulation sighting binoculars are used, and transmitting or causing to be transmitted, to the simulation sighting binoculars, graphical elements corresponding to the virtual objects according to the geolocation information for the simulation sighting binoculars and the orientation information for their camera which is transmitted by the simulation sighting binoculars.

BRIEF DESCRIPTION OF THE DRAWINGS

The aforementioned features of the invention, as well as others, will become more clearly apparent on reading the following description of at least one exemplary embodiment, the description being given in relation to the appended drawings, among which.

DETAILED DESCRIPTION OF THE PREFERRED EMBODIMENTS

Figure 1:
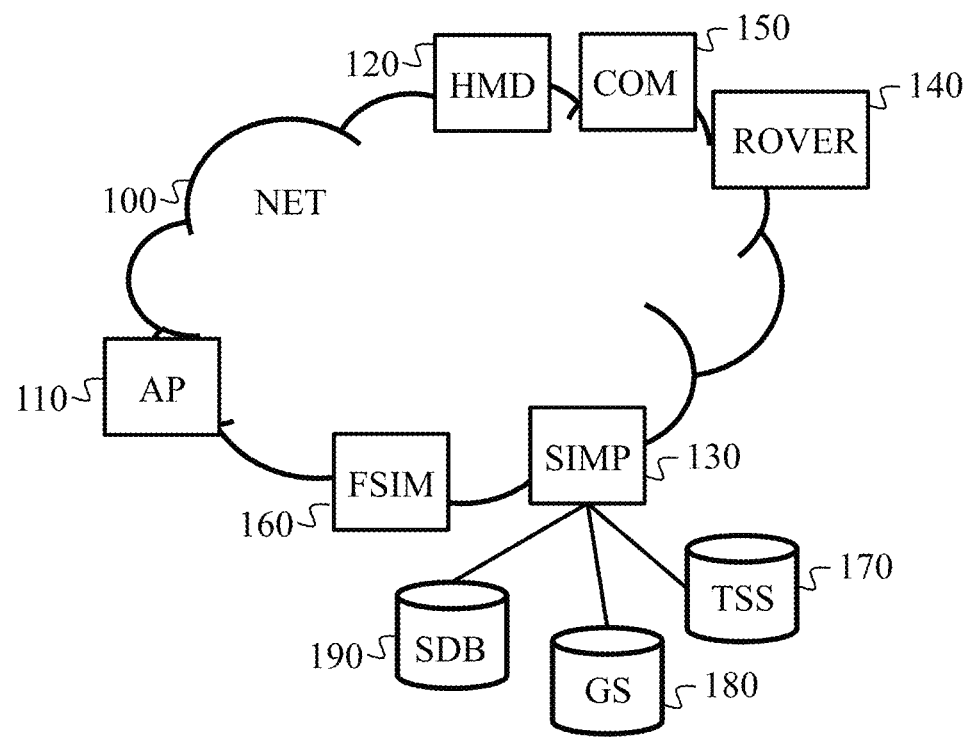
FIG. 1 schematically illustrates a system for simulating field training intended for fire support controllers.

FIG. 1 schematically illustrates a system for simulating field training intended for combatants. In one embodiment, the simulation system makes it possible to carry out field training for combatants and various inter-arms and joint-army combat participants, in order to train them, directly on the ground, to request and to control fire support from various armies.

The simulation system comprises sighting binoculars, in the form of a binocular head-mounted display (HMD) 120. The sighting binoculars (HMD) 120 preferably simulate models of sighting binoculars as used by the armed forces. The sighting binoculars (HMD) 120 are an item of mixed-reality equipment which makes it possible for a simulation fire support controller, called the "main trainee", to interact with virtual actors on the real terrain. The simulation system immerses the main trainee in a training scenario, by superimposing a virtual scene on video images captured by a camera (video camera) of the sighting binoculars (HMD) 120. The simulation system may comprise a plurality of such sighting binoculars, so as to equip a team-mate and/or a supervisor, in order to make it possible for them to immerse themselves in the simulation independently of the main trainee.

As detailed below in relation to FIGS. 2A, 2B and 2C, the sighting binoculars (HMD) 120 preferably comprise a housing 1 for sighting binoculars which is coupled with a smart mobile telephone 2 (smartphone).

The simulation system preferably further comprises a fire simulator (FSIM) 160. The fire simulator (FSIM) 160 makes it possible to prepare, pilot and trigger a fire simulation according to a simulated operational context: for example, an air-to-ground fire simulator in the context of an air fire-support exercise, a ground-to-ground fire simulator in the context of an infantry fire-support exercise, a sea-to-ground fire simulator in the context of an exercise for fire support originating from maritime platforms, etc. The fire simulator (FSIM) 160 makes it possible to take control, for example by virtue of a joystick, of a simulated vehicle in charge of a strike on a target (combat airplane, combat helicopter, drone, artillery, naval vessel). This is an autonomous simulation station in which a simulated geographical view of the training ground in 3D (three dimensions) is displayed. The fire simulator (FSIM) 160 is preferably installed on a laptop computer.

The simulation system further comprises a simulation platform (SIMP) 130. The simulation platform (SIMP) 130 is connected to a tactical situation server (TSS) 170, to a geographical server (GS) 180 and to a simulation database (SDB) 190. The tactical situation server (TSS) 170 and/or the geographical server (GS) 180 and/or the simulation database (SDB) 190 can be connected to the simulation system or integrated into the simulation system, for example within the simulation platform (SIMP) 130.

The simulation system preferably further comprises a simulator of a system of ROVER (Remotely Operated Video Enhanced Receiver) type 140, namely an assembly at least formed of a simulator of an electro-optical sensor and a simulator of remote reception of video streams originating from these sensors. Systems of ROVER type are typically used in a combat situation to receive, on the ground, an on-board view, in real time (with a slight time lag), from an airplane or a drone in operation, so as to facilitate the execution of the tasks which are incumbent on fire support controllers in the field. In a training exercise for fire support requests, an observer in charge of carrying out strike guidance toward a target, as fire support controllers do in combat, generally has simulated video feedback from a weapon system used in the training scenario and piloted through the fire simulator (FSIM) 160. The simulator of a system of ROVER type thus provides a display of a video stream of a simulation of a view taken from the weapon system in question. This view simulation relies on 3D terrain modeling, using a digital terrain model that is then textured on the basis of satellite imagery, a modeling of meteorological conditions and a 3D rendering of the target. The simulator of a system of ROVER type is, for example, integrated into a tablet, a smart mobile telephone (smartphone) or a laptop computer, the simulated video stream then being preferably displayed via a dedicated application or via an HTML (HyperText Markup Language) page in a browser.

The simulation platform (SIMP) 130 is configured to create a 3D (three-dimensional) simulation environment comprising a 3D virtualization of the training area terrain, a virtualization of weapon systems implemented in the fire simulator (FSIM) 160 and their associated kinematics, a virtualization of targets to be hit and their associated kinematics, and the kinematics of projectiles toward these targets. The simulation platform (SIMP) 130 is configured to execute a training scenario comprising definitions of various events to be applied in the simulation and to generate a rendering of at least one view used by the fire simulator (FSIM) 160, a rendering of at least one video feedback view for the simulator of a system of ROVER type 140, and the provision of various simulation elements, as described below, to make possible a mixed-reality representation in the sighting binoculars (HMD) 120. Various virtual scenes, synchronized with each other, then exist in the simulation system, as described below.

The simulation platform (SIMP) 130 can comprise a training scenario editor. The training scenario editor is configured to provide an interface for configuring various parameters and entities of the simulation, such as: a list of real actors (trainer, supervisor, etc.), a list of synthetic entities (weapon systems, strike force and operator of the fire simulator, command post, etc.), a geographical delimitation of the training area (theater of operations), an initial situation (position of the synthetic entities, date and time), a list of dated markers for each synthetic entity involved in the simulation. The training scenario is then used as a reference when conducting the simulation, then analyzing its progress. The simulation platform (SIMP) 130 can comprise a training scenario recorder, making it possible to save, in a database, the training scenario thus edited. The simulation platform (SIMP) 130 can also obtain the training scenario to be applied in the simulation database (SDB) 190, intended to provide sets of applicable training scenarios in accordance with the terrain where the simulation is performed.

The simulation system can further comprise a communication terminal (COM) 150, in order to increase the realism of the simulation by placing the fire support controller as close as possible to its real field conditions. In this case, the fire simulator (FSIM) 160 is preferably also equipped with such a communication terminal, comprising, for example, an audio headset and a voice microphone, in order to make it possible for an operator of the fire simulator (FSIM) 160 to exchange verbally with the main trainee to receive guidance information in real time. The communication terminal (COM) 150 can also make it possible for the main trainee to exchange verbally with any other observer or actor in the training scenario also equipped with such a communication terminal. The communication terminal (COM) 150 preferably uses a technology of VoIP (Voice over IP) type. The communication terminal (COM) 150 can also include communication means for tactical messaging (SICS, L16, VMF, for example). In one particular embodiment, the communication terminal (COM) 150 is integrated into the smart mobile telephone 2 which is used to partially produce the sighting binoculars (HMD) 120, by connecting, for example, an audio headset and a voice microphone thereto. The communication terminal (COM) 150 can, as a variant, be integrated into the simulator of a system of ROVER type.

The simulation system further comprises a communication bus, or a communication network (NET) 100, making it possible to connect all of the aforementioned elements of the simulation system. For example, the communication network (NET) 100 complies with all or some of the IEEE 802.11 family of standards and an access point (AP) 110 manages the establishment of the communication network (NET) 100. The access point (AP) 110 can incorporate a router or bridge function, for example with a cellular network of LTE (Long-Term Evolution) type, in order to make elements of the simulation system remote, such as, for example, the fire simulator (FSIM) 160, or involve additional remote systems and/or simulators which can take part in the training scenario (command post, databases, etc.).

The geographical server (GS) 180 provides the simulation system with a 3D digital terrain model, preferably textured with satellite or aerial images for a realistic 3D rendering of the training area. The texture serves to increase the realism of the simulation for the fire simulator (FSIM) 160 and for the simulator of a system of ROVER type. The geographical server (GS) 180 provides inter-visibility and distance information for the synthetic entities in the virtual scene (e.g., presence of terrain elements masking a synthetic entity from an observation point). The geographical server (GS) 180 provides meteorological data used for modeling of weapon systems: influence on projectile trajectories of ambient temperature, atmospheric pressure, air humidity, visibility conditions, possible precipitation (rain, snow), wind strength and direction, etc.

The tactical situation server (TSS) 170 provides the simulation system with elements of the simulation which are useful for representing, in the virtual scene, weapon systems, targets and objects involved in the training scenario, as well as their behavior during the exercise (kinematics, etc.).

The simulation platform (SIMP) 130 can serve as a relay, possibly with data reformatting, between the tactical situation server (TSS) 170 and/or the geographical server (GS) 180, on the one hand, and the other elements of the simulation system which need to receive their data, on the other hand. The simulation platform (SIMP) 130 can also program the tactical situation server (TSS) 170 and/or the geographical server (GS) 180 to transmit these data to the rest of the simulation system. The transmission of the data originating from the tactical situation server (TSS) 170 and/or the geographical server (GS) 180 can, for example, be performed by virtue of all or some of the IEEE 1278 family of standards relating to the DIS (Distributed Interactive Simulation) protocol.

Figure 2A:
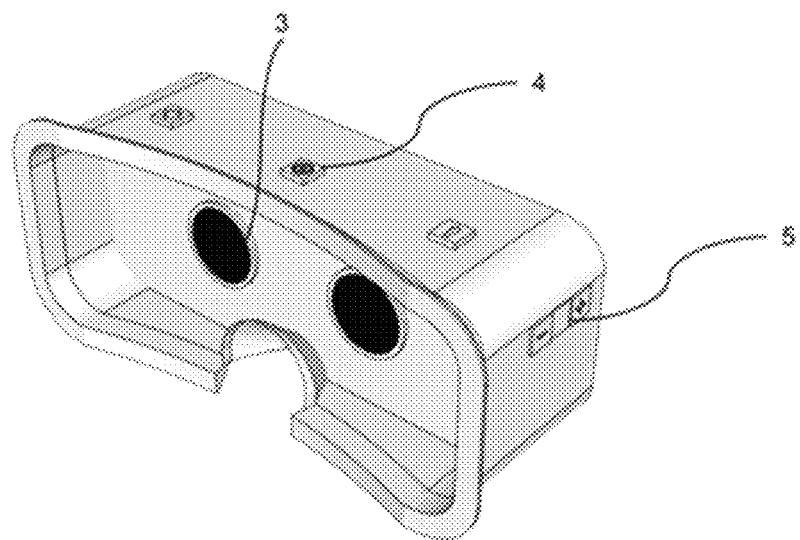
FIG. 2A schematically illustrates a housing for sighting binoculars of the simulation system of FIG. 1.

FIG. 2A schematically illustrates one embodiment of a housing 1 of the sighting binoculars (HMD) 120. The housing 1 of the sighting binoculars (HMD) 120 comprises a slot intended to receive and keep a smart mobile telephone 2 fixed. The housing 1 of the sighting binoculars (HMD) 120 comprises a pair of lenses 3 which are arranged to face the screen of the smart mobile telephone 2 when the latter is fixed to the housing 1 of the sighting binoculars (HMD) 120. The main trainee is supposed to place his/her eyes on the other side of the lenses 3, so as to have binocular vision of the screen of the smart mobile telephone 2 through the lenses 3.

The housing 1 of the sighting binoculars (HMD) 120 preferably comprises a button 4 for activating a calibration mode for the sighting binoculars (HMD) 120. For example, the main trainee activates the calibration mode by pressing the button 4. Particular embodiments of the calibration mode are described below in relation to FIG. 7.

The housing 1 of the sighting binoculars (HMD) 120 comprises a control member for adjusting the magnification factor, such as a pair of buttons 5. By pressing a first button of the pair of buttons 5, the main trainee controls a zoom in and, by pressing the second button of the pair of buttons 5, the main trainee controls a zoom out. The pair of buttons 5 can be replaced by an electromechanical wheel, zooming in being controlled by action of the electromechanical wheel in one direction of rotation and zooming out being controlled by action of the electromechanical wheel in the opposite direction of rotation.

The housing 1 of the sighting binoculars (HMD) 120 preferably comprises a button 6 for triggering telemetry reading. The telemetry reading is triggered by pressing the button 6, and the telemetry reading is stopped by subsequent pressing of the button 6 and/or after expiry of a predefined timeframe. As a variant, the telemetry reading continues as long as the button 6 continues to be pressed. The telemetry reading consists in displaying, in the sighting binoculars (HMD) 120, a piece of information on the distance which separates the position of the trainee from that of a target (which can be a virtual target, or another virtual object, or a terrain element) pointed to by the line of sight of the sighting binoculars (HMD) 120. This distance is measured using a method referred to as a ray tracing method in a virtual scene synchronized with the real scene. The virtual scene used for the telemetry calculation, called the detailed virtual scene, is distinct from the virtual scene used for rendering the mixed-reality objects in the sighting binoculars (HMD) 120 and comprises a 3D representation of the terrain, the objects of the scenario (target, forces involved, etc.) and representative objects above ground (tree, building, infrastructure, etc.). Ray tracing methods are well known in the prior art and form part of the standard features offered by commercial 3D rendering engines. In the context of the present description, the distance measurement is determined by a ray trace in the sighting direction of the sighting binoculars (HMD) 120, namely along the axis passing through the position of the observer and the center of the field of view (FOV) of the sighting binoculars (HMD) 120. The more accurate the digital model of the terrain modeling, the more accurate the distance measurement for the telemetry reading. The more complete the virtual scene used in terms of virtualization of objects which are present in the real scene (above ground), the more the distance measurements performed conform to reality. The counterweight to this richness and accuracy of the virtualization of the training ground and the objects of which it is composed is the volume of calculations and the memory capacity which are necessary to carry out the calculation of such a scene in 3D which is essential to the ray tracing methods implemented for distance measurement. The calculation of this 3D virtual scene is therefore remote from the sighting binoculars (HMD) 120, so that the sighting binoculars (HMD) 120 do not have to receive, process and manipulate data of the terrain modeling. Thus, when the telemetry reading is engaged, a request to measure the distance between the main trainee and a pointed-to target, comprising, among other things, the geolocation of the sighting binoculars (HMD) 120 and a direction vector which is representative of the sighting direction (for example a vector), is transmitted to a remote processing unit, such as, for example, the processing unit (processor, memory, etc.) of the simulator of a system of ROVER type or the simulation platform (SIMP) 130. The remote processing unit carries out the measurement by ray tracing in the detailed virtual scene, using the geolocation of the sighting binoculars (HMD) 120 and the direction vector transmitted in the request. This measurement is fed back to the sighting binoculars (HMD) 120 to then preferably be displayed in a plane representing a sighting reticle according to display features of the model of simulated sighting binoculars.

According to one particular embodiment, the measurement of the distance between the main trainee and a pointed-to target is then refreshed at a predefined frequency by the remote processing unit without any further request from the sighting binoculars (HMD) 120, and the distance measurement is obtained and transmitted by the remote processing unit to the sighting binoculars (HMD) 120 as soon as the value of the measurement differs from the previous one. In this particular embodiment, the sighting binoculars (HMD) 120 inform the remote processing unit of any change in their geolocation and/or their orientation (i.e., of their sighting direction), so that the remote processing unit can take this into account when calculating the required distance. Thus, the sighting binoculars (HMD) 120 have a piece of distance information which is always up to date regardless of the movements of the sighting binoculars (HMD) 120 and the position of the pointed-to target (moving or not), and ready to be displayed when the telemetry reading mode is engaged.

The housing 1 of the sighting binoculars (HMD) 120 preferably comprises a button 7 for triggering magnetic compass reading. The housing 1 of the sighting binoculars (HMD) 120 may comprise additional control members, such as buttons or wheels. All or some of the buttons of a simulated model of sighting binoculars can thus be reproduced.

When the sighting binoculars (HMD) 120 are based on an architecture using the smart mobile telephone 2, the control members of the housing 1 are connected to an integrated wireless transmission component which is compatible with a radio technology implemented by the smart mobile telephone 2, such as, for example, Bluetooth (registered trademark). The manipulation of the control members is then transformed into respective control messages, transmitted to the smart mobile telephone 2 via the integrated wireless transmission component. As a variant, the control of the smart mobile telephone 2 can be carried out via a wired connection interface, such as for example a connection interface of Lightning type for iPhone (registered trademark) smart mobile telephones from Apple (registered trademark).

Figure 2B:
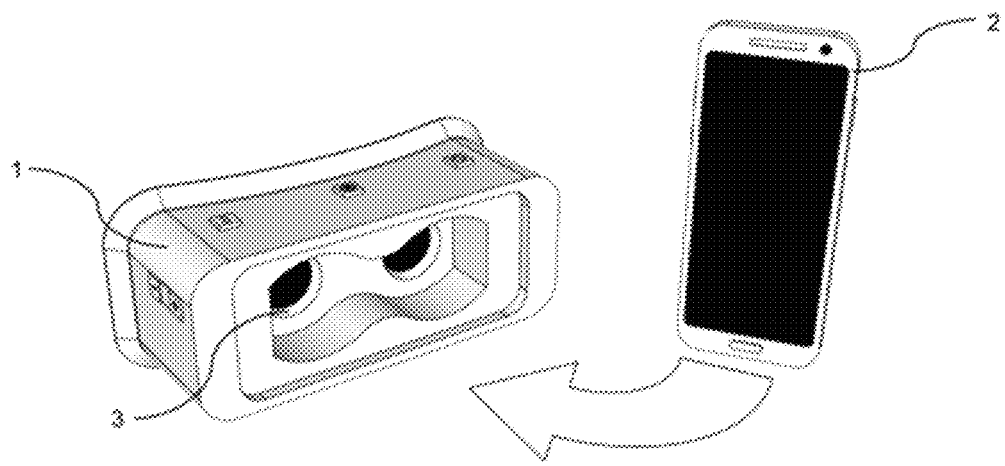
FIG. 2B schematically illustrates a coupling between the housing for sighting binoculars of FIG. 2A and a smart mobile telephone, in order to constitute sighting binoculars.

FIG. 2B schematically illustrates that the housing 1 of the sighting binoculars (HMD) 120 is adapted to be mechanically coupled to the smart mobile telephone 2. The smart mobile telephone 2 typically comprises a camera (video camera) 8, a loudspeaker 9 and a set of integrated components 10 including a sensor of inertial measurement unit (IMU) type and preferably a GPS (Global Positioning System) receiver. When the sighting binoculars (HMD) 120 do not need a smart mobile telephone to operate, the camera 8 and the set of integrated components 10 including at least the sensor of inertial measurement unit (IMU) type are directly incorporated into the housing of the sighting binoculars (HMD) 120, as is the screen.

Figure 2C:
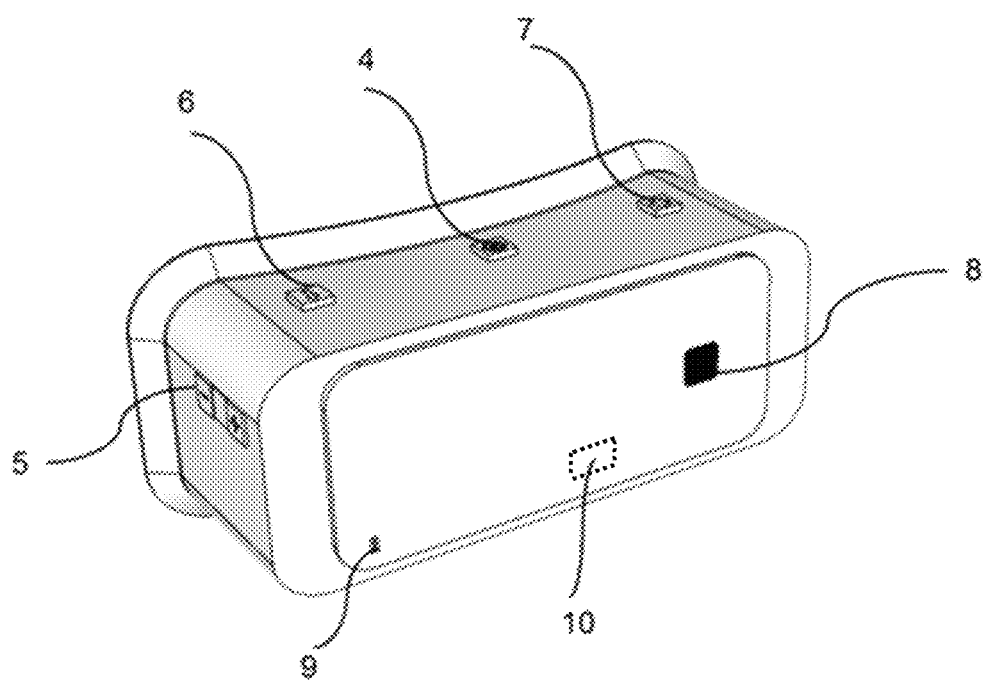
FIG. 2C schematically illustrates the housing for sighting binoculars and the smart mobile telephone after carrying out the coupling according to FIG. 2B.

FIG. 2C schematically illustrates the housing 1 of the sighting binoculars (HMD) 120 and the smart mobile telephone 2 after mechanical coupling. The mechanical coupling is such that the smart mobile telephone 2 is joined to the housing 1 of the sighting binoculars (HMD) 120. The mechanical coupling is such that, when the main trainee puts on the sighting binoculars (HMD) 120, the main trainee sees the screen of the smart mobile telephone 2 through the lenses 3, the camera 8 then being located on the opposite side of the sighting binoculars (HMD) 120 from the one where the main trainee is.

The sighting binoculars (HMD) 120 are configured, in particular, by virtue of a configuration of the smart mobile telephone 2 and of the arrangement of the smart mobile telephone 2 with the housing 1, to reproduce a see-through display (a device of "video-see-through" type is referred to). For this purpose, an ARCore library (registered trademark) from Google (registered trademark), or an ARKit library (registered trademark) from Apple (registered trademark), can be used. Thus, when using the sighting binoculars (HMD) 120, the main trainee sees through the lenses 3, in mixed reality, a real-time video captured by the camera 8 enriched by virtual objects. In order to reproduce the binocular effect of observation binoculars, the smart mobile telephone 2 is configured to display on its screen the captured video in the form of a right-eye view and a left-eye view.

Thus, a virtual target which is present in the virtual scene of the training scenario which is in the field of view of the observer defined by the camera 8 of the smart mobile telephone 2 is displayed superimposed on the real view captured by the camera 8. In addition to the virtual scene originating from the training scenario, the display on the screen of the smart mobile telephone 2 can be enriched with additional information (azimuth, telemetry, crosshair, applied magnification, etc.).

Figure 2D:
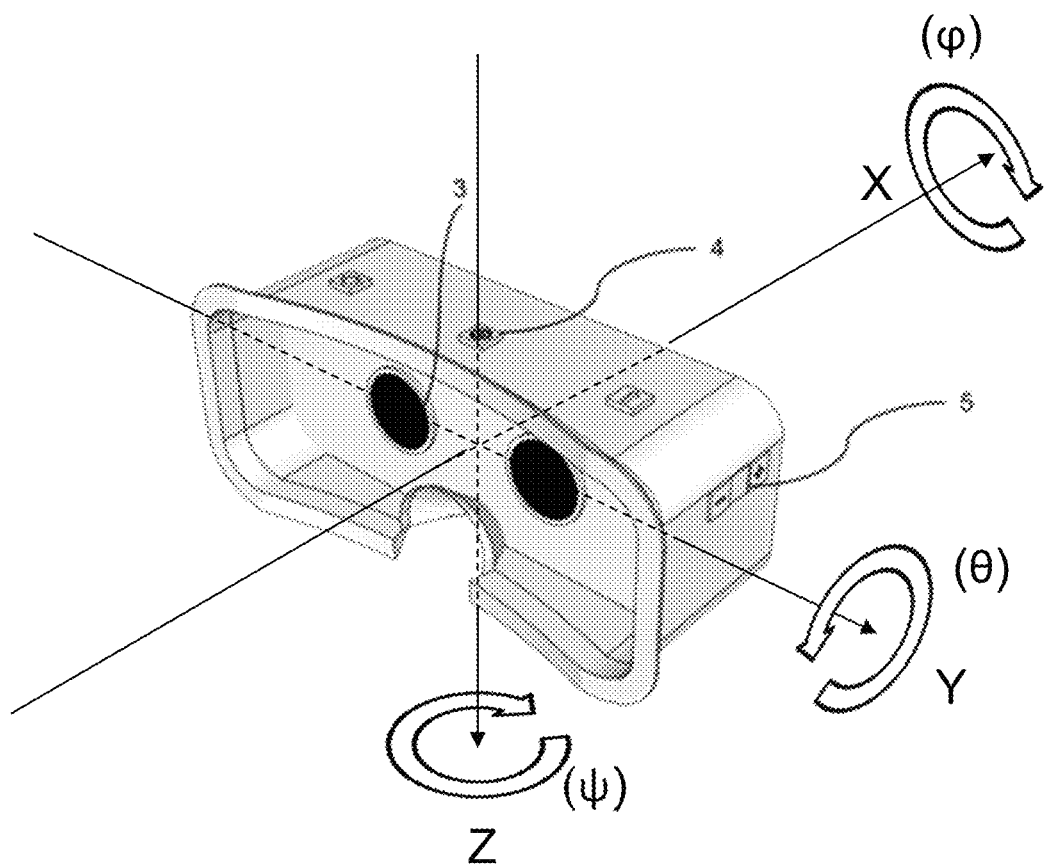
FIG. 2D schematically illustrates the definition of the Euler angles with respect to the sighting binoculars.

For reference, FIG. 2D schematically illustrates the definition of the Euler angles with respect to the sighting binoculars (HMD) 120, in a direct orthonormal frame (X, Y, Z). These Euler angles typically serve as orientation information for the sighting binoculars (HMD) 120, thus defining a sighting direction vector. The Euler angles are thus an angle of vertical inclination or of pitch θ about the Y axis, an angle of orientation with respect to magnetic North or of yaw Ψ (heading) about the Z axis, and a roll angle φ about the X axis.

Figure 3:
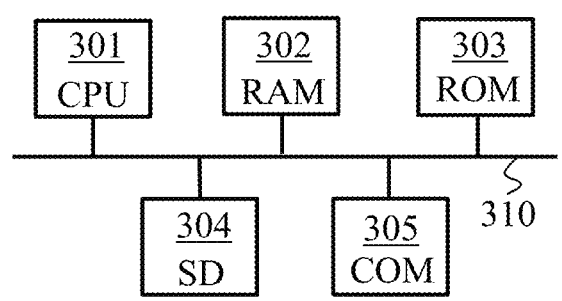
FIG. 3 schematically illustrates an exemplary hardware architecture of at least one device of the simulation system of FIG. 1.

FIG. 3 schematically illustrates an exemplary hardware architecture of a device of the simulation system. The exemplary hardware architecture is applicable to a control and processing unit of the sighting binoculars (HMD) 120, in particular to the smart mobile telephone used to partly constitute the sighting binoculars (HMD) 120. The exemplary hardware architecture is also applicable to a control and processing unit of the simulation platform (SIMP) 130. The exemplary hardware architecture is also applicable to a control and processing unit of the simulator of a system of ROVER type 140. The exemplary hardware architecture is also applicable to a control and processing unit of the fire simulator (FSIM) 160. The exemplary hardware architecture is also applicable to a control and processing unit of the tactical situation server (TSS) 170 and/or of the geographical server (GS) 180 and/or of the simulation database (SDB) 190. The exemplary hardware architecture is also applicable to a control and processing unit of the communication terminal (COM) 150.

The device then comprises, connected by a communication bus 210: one or more processors or CPUs (Central Processing Units) 301; a random-access memory (RAM) 302; a read-only memory (ROM) 303, for example of EEPROM (Electrically Erasable Programmable ROM) type or a Flash memory; a storage unit 304, such as a hard disk drive (HDD), or a storage medium reader, such as an SD (Secure Digital) card reader; and a communication interface manager (COM) 305.

The communication interface manager (COM) 305 makes it possible for the device to communicate with the other devices of the communication system, more particularly via the communication network (NET) 100.

The processor 301 is capable of executing instructions loaded into the random-access memory (RAM) 302 from the read-only memory (ROM) 303, an external memory, a storage medium (such as an SD card), or a communication network (which is potentially distinct from the communication network (NET) 100). When the device is switched on, the processor 301 is capable of reading instructions from the random-access memory (RAM) 302 and executing them. These instructions form a computer program causing the processor 301 to implement all or some of the steps, operations and behaviors described here in relation to the device in question.

All or some of the steps, operations and behaviors described here in relation to the device in question can thus be implemented in software form by a programmable machine, for example a processor of DSP (Digital Signal Processor) type or a microprocessor, executing a set of instructions, or be implemented in hardware form by a dedicated component or machine, for example an FPGA (Field-Programmable Gate Array) or ASIC (Application-Specific Integrated Circuit) component. Generally, the device in question comprises electronic circuitry adapted and configured to implement, in software and/or hardware form, the steps, operations and behaviors described here in relation to the device in question.

Figure 4:
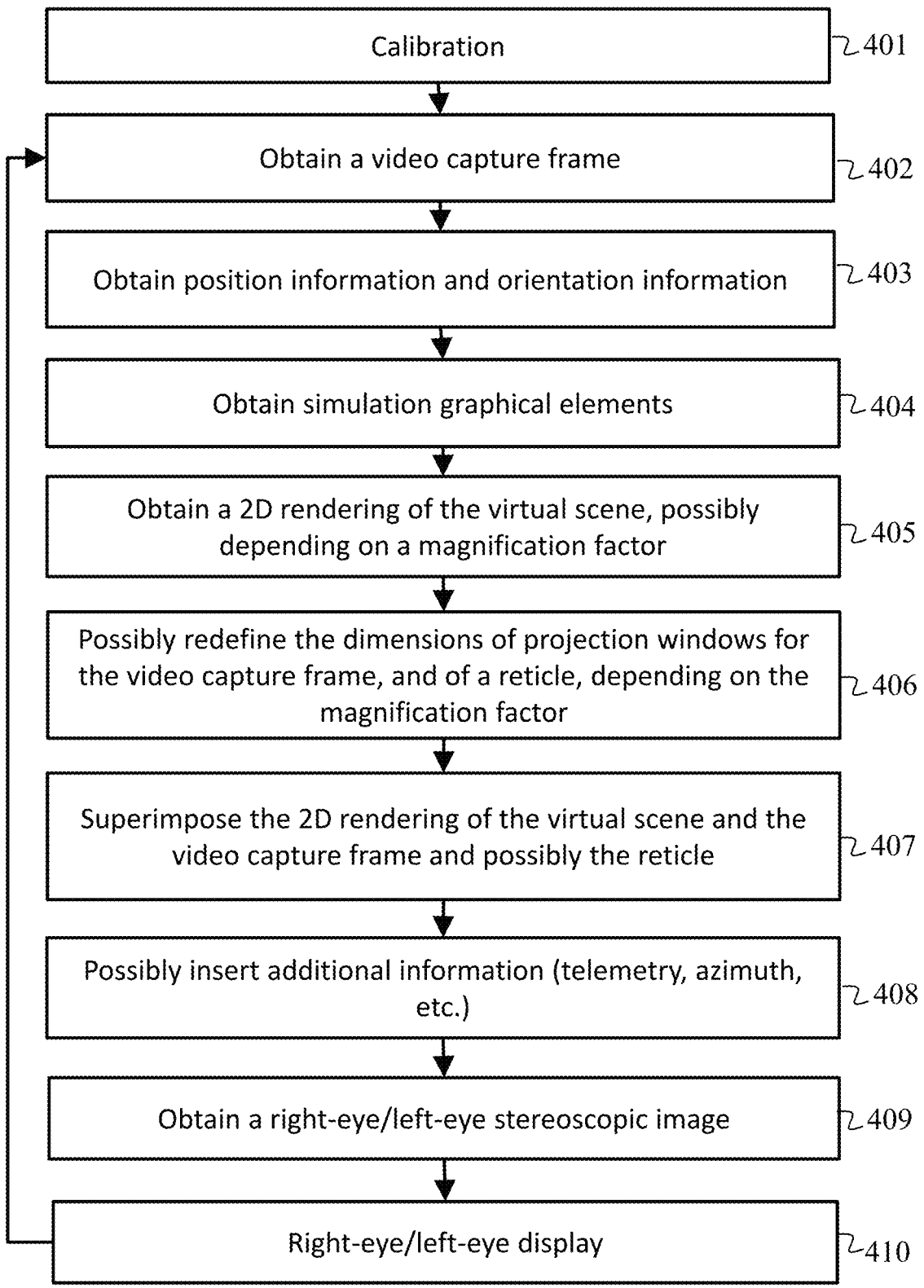
FIG. 4 schematically illustrates an algorithm for display management via the sighting binoculars.

FIG. 4 schematically illustrates an algorithm for display management via the sighting binoculars (HMD) 120.

Figure 6:
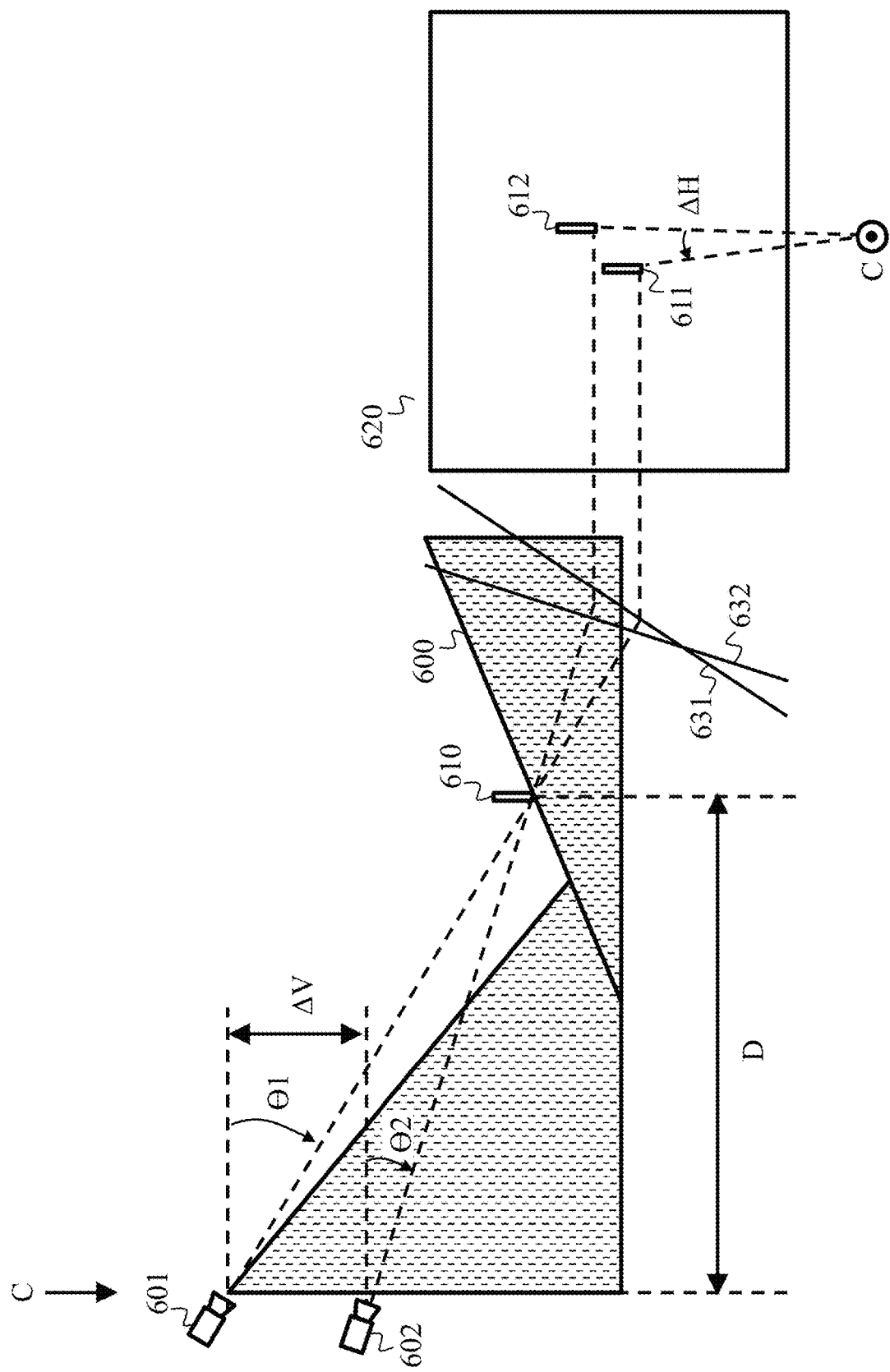
FIG. 6 schematically illustrates offsets to be taken into consideration for calibration of the display via the sighting binoculars.

In a step 401, calibration operations are preferably carried out. The calibration comprises operations which make it possible to obtain and correct a lateral deviation (heading deviation) ΔH, an inclination deviation (pitch deviation) Δθ and a vertical deviation ΔV between the real view of the terrain as captured by the camera 8 and the modeling of the terrain used by the simulation platform (SIMP) 130 to create the virtual scene. The deviations ΔH and ΔV are shown in FIG. 6. The deviation Δθ corresponds to the difference between the angles of inclination θ1 and θ2 in FIG. 6. This deviation Δθ is determined during the calibration operations to estimate the vertical deviation ΔV.

The values of the deviations in question can be obtained by prior configuration. The values of the deviations in question are preferably obtained by virtue of calibration operations in the field, as in particular described below in relation to FIG. 7.

In a step 402, the sighting binoculars (HMD) 120 obtain a real-time video capture frame. More particularly, the smart mobile telephone 2 receives a video capture frame generated by the camera 8. Each video frame provided by the camera 8 is preferably accompanied by 6-DoF (6 Degrees of Freedom) geographical tracking metadata. For an advantageous application of a magnification factor by the sighting binoculars (HMD) 120, the video frames are captured in the native field of view (FOV) of the camera 8, that is to say, without application of a magnification factor by the camera 8. The majority of smart mobile telephones on the market have a camera, such as the camera 8, with a field of view (FOV) between 65° and 80° and a ratio of the horizontal dimension to the vertical dimension of the shot of 4/3.

In a step 403, the sighting binoculars (HMD) 120 obtain, in real time, geolocation information and spatial orientation information for the sighting binoculars (HMD) 120. For the orientation information, the sighting binoculars (HMD) 120 implement a SLAM (Simultaneous Localization And Mapping) algorithm Many SLAM algorithms are known, for example based on an extended Kalman filter or on a particle filter (also known under the name of sequential Monte Carlo method), and nowadays the majority of commercially available smart mobile telephones are equipped with them. For the geolocation information, the sighting binoculars (HMD) 120 preferably also use the SLAM algorithm. As a variant, the sighting binoculars (HMD) 120 use the GPS receiver. The SLAM algorithm makes it possible, however, to obtain geographical position information (translation information in the case of position indications provided in a relative manner) which is more accurate than the GPS receiver. The GPS receiver is, in this case, used only to determine the initial position of the SLAM algorithm, or in the event of temporary stalling of the SLAM. Thus, the sighting binoculars (HMD) 120 can use the GPS receiver in degraded mode, when the SLAM algorithm has stalled.

The SLAM algorithm determines the orientation information, typically the Euler angles, and the position information, typically the translation information, by recognizing objects located in the field of view of the camera 8, at the refresh frequency of the camera 8 (for example, 30 or 60 Hz). The orientation and position information provided by the SLAM algorithm does not undergo any drift. However, the accuracy of the SLAM algorithm is dependent on the objects located in the field of view of the camera 8. When the filmed scene does not have enough usable objects, the SLAM algorithm does not operate correctly. Thus, if the main trainee looks at the sky and not at the ground in front of him/her, the SLAM algorithm may not have enough physical reference points and stalls. This situation can also, for example, occur when the capture of a video of the terrain offers little relief or contrast, in particular in winter conditions with the presence of snow or mist, or, conversely, in conditions in which the video sensor is saturated in the event of the sun refracting on wet ground, for example.

As detailed below in relation to FIG. 5, when the SLAM algorithm is operational, the sighting binoculars (HMD) 120 use the orientation information, typically the Euler angles, as well as preferably the position information, typically the translation information, provided by the SLAM algorithm. Also, when the SLAM algorithm stalls, the sighting binoculars (HMD) 120 use the orientation information, typically the Euler angles, provided by the sensor of inertial measurement unit (IMU) type with which the sighting binoculars (HMD) 120 are equipped (more particularly with which the smart mobile telephone 2 is equipped) and preferably position information originating from geolocation measurements provided by the GPS receiver. Preferably, the sighting binoculars (HMD) 120 use the last known absolute position before stalling, for as long as the SLAM algorithm is inoperative. When the sighting binoculars (HMD) 120 use the orientation information provided by the sensor of inertial measurement unit (IMU) type, the sighting binoculars (HMD) 120 correct it by compensating for a measurement difference between the orientation information provided by the sensor of inertial measurement unit (IMU) type and the orientation information provided by the SLAM algorithm at the moment when the SLAM algorithm stalls. The sighting binoculars (HMD) 120 also correct the orientation information used, when it comes from the SLAM algorithm, in accordance with the deviations revealed by the calibration operations. The main trainee may thus track a virtualized aircraft in the sky as part of the training scenario, without losing the orientation of the camera despite the stalling of the SLAM algorithm.

In a step 404, the sighting binoculars (HMD) 120 obtain, in real time, simulation graphical elements relating to virtual objects of the training scenario, that is to say, elements relating to virtual scene objects to be displayed in mixed reality. The simulation graphical elements are provided to the sighting binoculars (HMD) 120 by the tactical situation server (TSS) 170, preferably via the simulation platform (SIMP) 130. The simulation graphical elements may be the graphical objects themselves, in three dimensions. However, considering that the sighting binoculars (HMD) 120 may have a previously installed and configured internal library of graphical objects, the simulation graphical elements provided by the tactical situation server (TSS) 170 are then indications of types of graphical objects in the virtual scene and their kinematics. The simulation graphical elements are, for example, provided by virtue of the DIS protocol. Rather than receiving the complete virtual scene incorporating the terrain modeling, the sighting binoculars (HMD) 120 only receive information relating to the virtual objects in the scenario (that is to say without the 3D model of the training ground and preferably without the 3D model of the objects). The processing to be performed by the sighting binoculars (HMD) 120 to implement the mixed-reality display is thus reduced, thereby facilitating a real-time synchronized superimposition of the virtual scene on the real scene in the sighting binoculars (HMD) 120. This approach is particularly well-suited to a mixed-reality display produced by virtue of a smart mobile telephone (which typically has much lower processing performance than a computer or a server), while complying with video frame rate imposed by the capture of video frames by the camera 8.

The simulation platform (SIMP) 130 thus uses 3D terrain modeling to define scenario elements in the applicable field of view (FOV) (virtual objects that are not hidden by terrain relief, kinematics, etc.), but only the scenario elements visible in the field of view (FOV) with the exception of the representation of the terrain are transmitted to the sighting binoculars (HMD) 120. In order that the simulation platform (SIMP) 130 is able to ascertain the applicable field of view (FOV), the sighting binoculars (HMD) 120 transmit, at the same frequency as the video capture of the camera 8 (for example 30 or 60 Hz), the geolocation information provided by the SLAM algorithm or the GPS receiver, and the orientation information from step 403. The simulation platform (SIMP) 130 is able to determine the altitude to be applied for determining the field of view (FOV), by virtue of the geolocation of the sighting binoculars (HMD) 120 and elevation information for the digital terrain model, corrected by the calibration operations, as well as preferentially the position (for example translation) information provided by the SLAM algorithm (thus making it possible for example to detect a change of the main trainee from the "squatting" position to the "standing" position). The sighting binoculars (HMD) 120 obtain, at the same rate, the virtual objects at the same rate, so as to be able to refresh the virtual objects in a manner synchronized with the refreshing of the images captured by the camera 8. The sighting binoculars (HMD) 120 may receive the simulation graphical elements relating to the virtual objects to be displayed at a lower rate, and the sighting binoculars (HMD) 120 then perform interpolation operations so as to be able to refresh the virtual objects in a manner synchronized with the refreshing of the images captured by the camera 8. Thus, perfect synchronization of the real scene and the virtual scene may be obtained in mixed reality in the sighting binoculars (HMD) 120 at the frequency of the video capture of the camera (30 or 60 Hz).

The sighting binoculars (HMD) 120 may receive simulation graphical elements in response to each sending of geolocation information and orientation information, according to a request-response mechanism. However, one preferred approach consists in transmitting the simulation graphical elements asynchronously with respect to the sending of geolocation information and orientation information. It is then preferable to readjust the simulation graphical elements (or the corresponding virtual objects) in order to prevent them from giving the impression of "floating" in mixed reality. Thus, in one particular embodiment, the simulation graphical elements obtained in step 404 are, prior to their display by the sighting binoculars (HMD) 120, readjusted to the terrain modeling. This readjustment comprises calculating the altitude on the terrain modeling of the virtual object in question, at its current geographical position. Indeed, the training scenarios use trajectories of moving objects defined by a starting position, an arrival position and possible intermediate positions, as well as a speed of movement and a direction of movement. Based on this information, a simulation engine animates the virtual object in question, so that it moves along its trajectory, in the given direction of movement and at the given speed of movement. Between two known positions of the scenario, the simulation engine interpolates the positions of the virtual object so as to stick as closely as possible to the trajectory predefined in the training scenario. This interpolation does not take into account the underlying ground truth. An offset between the interpolated altitude and the altitude of the terrain modeling under the virtual object may exist. This offset should be corrected to prevent it from affecting the representation of the moving object in the virtual scene of the sighting binoculars (HMD) 120 and causing jumping effects of the virtual object when the virtual scene is rendered in the sighting binoculars (HMD) 120. In one particular embodiment, the readjustment of the altitude of each virtual object on the digital terrain model is requested by the simulation engine upon each change of position of the virtual object in the scenario, by reading, from the digital terrain model available on the geographical server (GS) 180, the altitude value at the position of the virtual object under consideration.

In another embodiment, the altitude value is extracted from the detailed virtual scene generated by the already-mentioned remote processing entity. This enriched virtual scene, also used to calculate the telemetry information for the sighting binoculars, comprises, in particular, a 3D representation of the most accurate terrain modeling available on the geographical training area. The altitude value of the terrain at the position of the virtual object under consideration may therefore also be obtained by calculating the vertical distance between the base of the virtual object and the underlying terrain.

Regardless of the two particular embodiments cited above, the readjustment of the simulation graphical elements (or virtual objects) on the digital terrain model may also use information representative of the slope of the terrain at the position of the virtual object, in order to readjust the orientation of the virtual object in the scene. Indeed, the virtual object moving on its trajectory, in accordance with the parameters given by the training scenario, may be located on a change in the slope of the terrain. In this configuration, the altitude readjustment might not be sufficient to correctly perform the readjustment on the terrain. It is then also necessary to adjust its orientation with respect to the slope of the terrain. This adjustment comprises adjusting the orientation of the virtual object under consideration with respect to the slope of the terrain, represented for example by a vector corresponding to the normal to the slope of the terrain at the geographical position under consideration. For this readjustment of the orientation of the virtual object in question, the normal to the slope of the terrain may be obtained through calculation from the altitude information extracted from the terrain modeling close to the geographical position under consideration, or through a calculation of the average of the normals of the faces of the terrain in 3D located close to the geographical position under consideration in the detailed virtual scene.

In one particular embodiment, the simulation graphical elements are accompanied by simulation audio elements, so as to increase the realism of cinematic effects (explosion of a virtual target, noise of an approaching vehicle, etc.). These simulation audio elements are intended to be played by the sighting binoculars (HMD) 120, through the loudspeaker 9, synchronously with the simulation graphical elements that they accompany.

In a step 405, the sighting binoculars (HMD) 120 perform a 2D rendering (projection) of the 3D virtual objects (i.e., the elements of the virtual scene) whose corresponding graphical elements were received in step 404. For example, the sighting binoculars (HMD) 120, and, more particularly, the smart mobile telephone 2, use the Unity (registered trademark) simulation engine developed by Unity Technologies for this purpose. The 2D rendering is intended to be displayed in a projection window ("viewport") E2 (see FIG.

8A). The background of the 2D rendering is transparent. The size of the projection window E2 is fixed, with a constant image resolution, even when a magnification (zoom) factor is to be applied. When a magnification factor is to be applied, the sighting binoculars (HMD) 120 receive the simulation graphical elements from the virtual objects to be displayed with a field of view (FOV) that is adjusted according to the magnification factor (horizontal dimension and vertical dimension of the field of view (FOV) of the virtual camera used by the sighting binoculars (HMD) 120 divided by "2" when the magnification factor is "2" (zoom ×2)). Thus, the sizes of the virtual objects to be represented in the adjusted field of view (FOV) have dimensions twice as large as their dimensions without a magnification factor in the projection window E2. In order that the simulation platform (SIMP) 130 is aware of the adjustment according to the magnification factor to be applied to the applicable field of view (FOV), when the main trainee commands a zoom in or a zoom out on the sighting binoculars (HMD) 120 (e.g., respectively by pressing a button ZOOM+ or a ZOOM−), the sighting binoculars (HMD) 120 inform at least the simulation platform (SIMP) 130 of this. Thus, the simulation platform (SIMP) 130 adjusts the dimensions of the field of view (FOV) of the virtual camera accordingly. For example, without a magnification factor, the field of view (FOV) of the virtual camera is equal to 110° vertically and the same horizontally. This field of view (FOV) value and this 1/1 ratio between its horizontal and vertical value are constrained by the binocular device (cf. lenses 3) used in the sighting binoculars (HMD) 120, the latter reproducing the binocular stereoscopic field of view in humans. The field of view (FOV) of the virtual camera and, by design, the projection window E2 are thus square in shape, facilitating the display of a right-eye/left-eye stereoscopic image. By applying a magnification factor equal to "2", the field of view (FOV) of the virtual camera becomes equal to 55° vertically and the same horizontally.

In a step 406, when a magnification factor is to be applied, the sighting binoculars (HMD) 120 redefine the dimensions of a projection window for the video capture frame, and preferably of a projection window for a reticle.

Figure 8A:
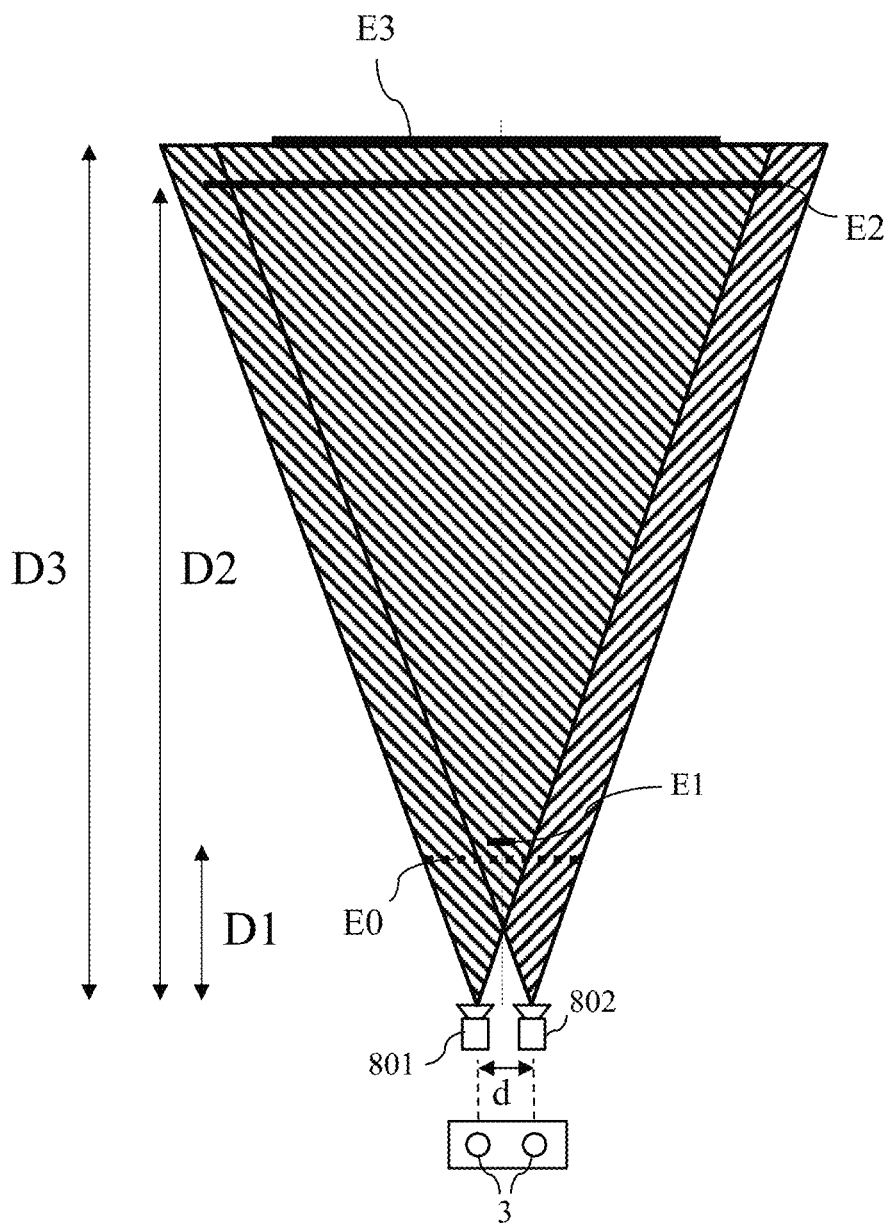
FIG. 8A schematically illustrates an arrangement of projection windows to constitute mixed-reality video frames, without a magnification factor.

Indeed, by default, without a magnification factor, the video capture frame is projected onto a projection window E3 whose dimensions conform to the 77° horizontal field of view (FOV) of the camera 8 and with a horizontal dimension to vertical dimension ratio of 4/3 (see FIG. 8A). Thus, by design, given the difference between the FOV of the camera 8 and that of the virtual camera of the sighting binoculars, the dimensions of the projection windows E3 and E2 are not identical and, although they are both centered, do not overlap completely. An opaque mask (e.g., black) is then applied by the sighting binoculars (HMD) 120 around the projection window E3, so as to mask the surface difference between the projection window E3 and the projection window E2. The reticle in the present description is an image on a transparent background of square or rectangular dimension, which may represent, for example, a single or multiple intersecting or non-intersecting graduation allowing the main trainee to carry out precise sighting. The reticle is projected onto a projection window E1 (see FIG. 8A) whose dimensions conform to a horizontal field of view (FOV) corresponding to the angular deviation between the left-hand end and the right-hand end of the graduations of the reticle (expressed, for example, in NATO mils: 6400 mils=2 PI radians). It is therefore sufficient to count the horizontal graduations of the reticle to obtain the horizontal dimensions of the field of view (FOV) corresponding to the reticle in NATO mils (any other unit of angular measurement may be used depending on the model of the simulated sighting binoculars and the reticle thereof). The same principle applies to the vertical dimensions of the field of view (FOV) corresponding to the reticle, in the event of the reticle having vertical graduations. Otherwise, the vertical dimensions of the field of view (FOV) corresponding to the reticle are defined so as to precisely comply with the horizontal and vertical ratio of the reticle image.

Figure 8B:
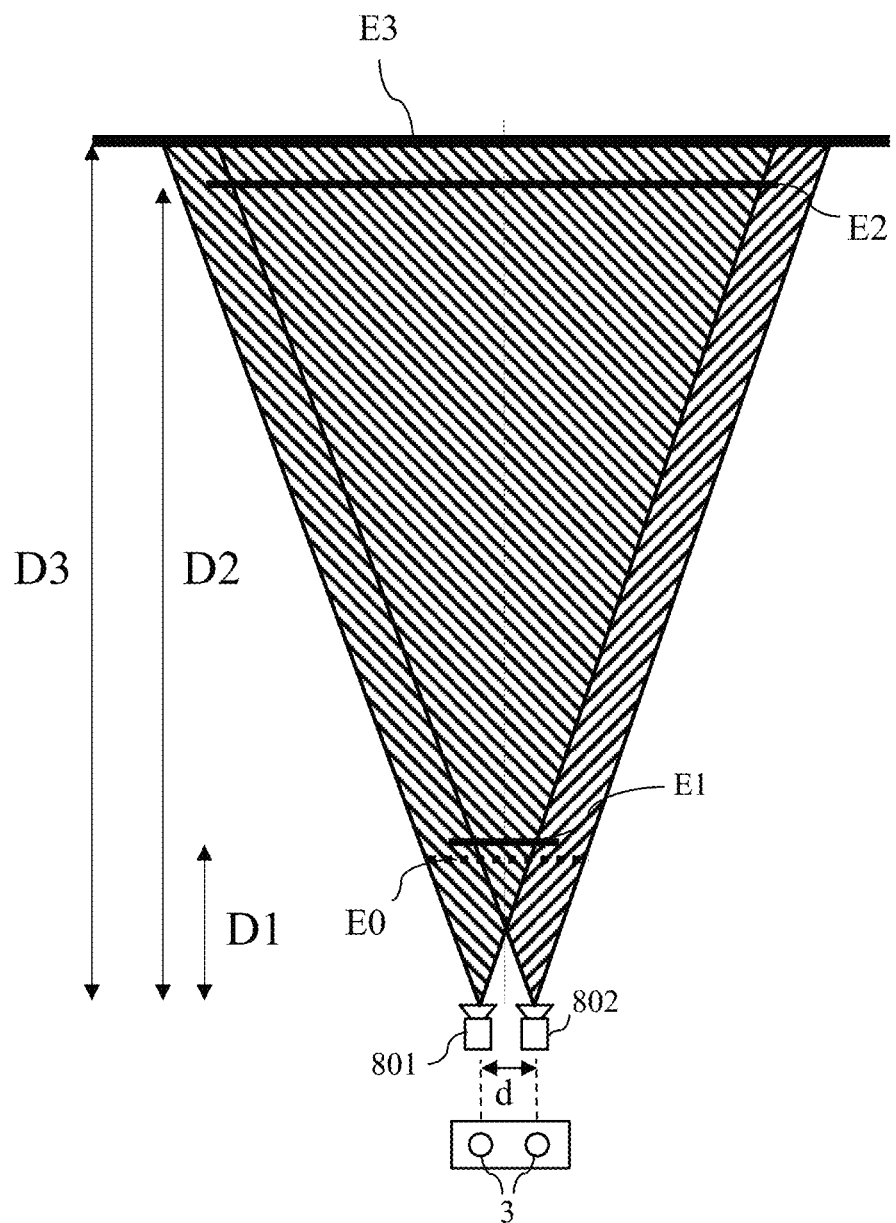
FIG. 8B schematically illustrates an arrangement of projection windows to constitute mixed-reality video frames, with a magnification factor.

When a magnification factor is applied, the dimensions of the projection window E3 are increased (vertically and horizontally, in comparison with the projection window E3 without a magnification factor) by the same proportion as the magnification factor to be applied. In other words, the horizontal dimension and the vertical dimension of the projection window E3 are doubled when the magnification factor is equal to "2". An adaptation of the size of the projection window E3 according to a magnification factor to be applied is shown schematically in FIG. 8B. It should be noted that, following the redimensioning of the projection window E3 according to the magnification factor to be applied, the projection window E3 may become larger than the projection window E2. When a reticle is to be displayed, the sighting binoculars (HMD) 120 adjust the dimensions of the projection window E1 in the same way as they adjust the dimensions of the projection window E3 (i.e., doubled when the magnification factor is equal to "2").

In a step 407, the sighting binoculars (HMD) 120 superimpose, in a virtual scene which is local to the sighting binoculars (HMD) 120, the 2D rendering of the virtual objects with the video capture frame, and possibly the reticle.

The projection window E2 is placed on a plane, orthogonal to the line of sight, at a distance D2 from the position of the virtual stereoscopic camera that coincides with the position of the observation point. The line of sight passes through the center of the projection window E2. For example, the distance D2 is set at 10 meters.

The projection window E3 is placed on a plane, orthogonal to the line of sight, at a distance D3 from the position of the main trainee (observation point). The line of sight passes through the center of the projection window E3. The distance D3 is greater than the distance D2 for ensuring that the virtual objects in the training scenario are superimposed on the video capture frame in mixed reality. For example, the distance D3 is set at approximately 10 meters plus 1 centimeter.

When a reticle (on a transparent background) is to be displayed, the projection window E1 is placed on a plane, orthogonal to the line of sight, at a distance D1 from the position of the main trainee (observation point). The line of sight passes through the center of the projection window E1. The distance D1 is smaller than the distance D2 for ensuring that the reticle is superimposed on the virtual objects in the training scenario and on the video capture frame in mixed reality. For example, the distance D1 is set at approximately 1 meter (value for comfortably accommodating the vast majority of users).

Thus, when a magnification factor is to be applied, no modification to the magnification is made at the camera 8, which remains in the native field of view (FOV), thereby limiting the stalling of the SLAM algorithm.

In an optional step 408, the sighting binoculars (HMD) 120 insert, superimposed in the foreground, additional information, such as telemetry information (distance from a target, sighting azimuth, etc.) and/or any magnification factor applied in step 406. This additional information is typically information of a textual nature, but may also be information of a graphical nature (icon, logo, etc.). This possible additional information is displayed in a projection window E0 in the foreground, for example at 1 meter minus 1 centimeter. The projection window E0 is not affected by any possible magnification factor, since the latter must not have any impact on the display size of this additional information. In other words, the projection window E0 is insensitive to the magnification factor.

In a step 409, the sighting binoculars (HMD) 120 obtain a mixed-reality stereoscopic image from the superimposition of the various planes explained above. The stereoscopic image (in reality a pair of images) is obtained using a pair of virtual cameras 801, 802. The (angular) field of view (FOV) of the virtual camera used for the 2D rendering in step 405 without applying a magnification factor is identical to the (angular) field of view (FOV) of each of the virtual cameras 801, 802, for example 110°. The virtual cameras 801, 802 are placed on either side of and equidistantly from the line of sight of the sighting binoculars (HMD) 120, and have, between them, the same spacing ("d" in FIGS. 8A and 8B) as the lenses 3, generally referred to as the interocular distance of the binocular device (cf. lenses 3). Their respective sighting directions are parallel to the line of sight of the sighting binoculars (HMD) 120.

In a step 410, the sighting binoculars (HMD) 120 display the mixed-reality right-eye/left-eye stereoscopic image as obtained by executing the preceding steps of the algorithm of FIG. 4 on the screen of the smart mobile telephone 2 or on the screen of the sighting binoculars (HMD) 120 if these have their own integrated screen. The screen is split into two equal parts. The stereoscopic image corresponding to the virtual camera 801 (left eye) is displayed in the left-hand part of the screen, and the stereoscopic image corresponding to the virtual camera 802 (right eye) is displayed in the right-hand part of the screen. The sighting binoculars (HMD) 120 may apply a distortion to the right-eye/left-eye stereoscopic image obtained in step 409, so as to compensate for optical distortions induced by the lenses 3. If the simulation graphical elements relating to the virtual objects displayed in this mixed-reality display step were accompanied by simulation audio elements, the sighting binoculars (HMD) 120 play the simulation audio elements at the same time as the mixed-reality display.

The algorithm of FIG. 4 is thus successively iterated for each video frame captured by the camera 8.

Figure 5:
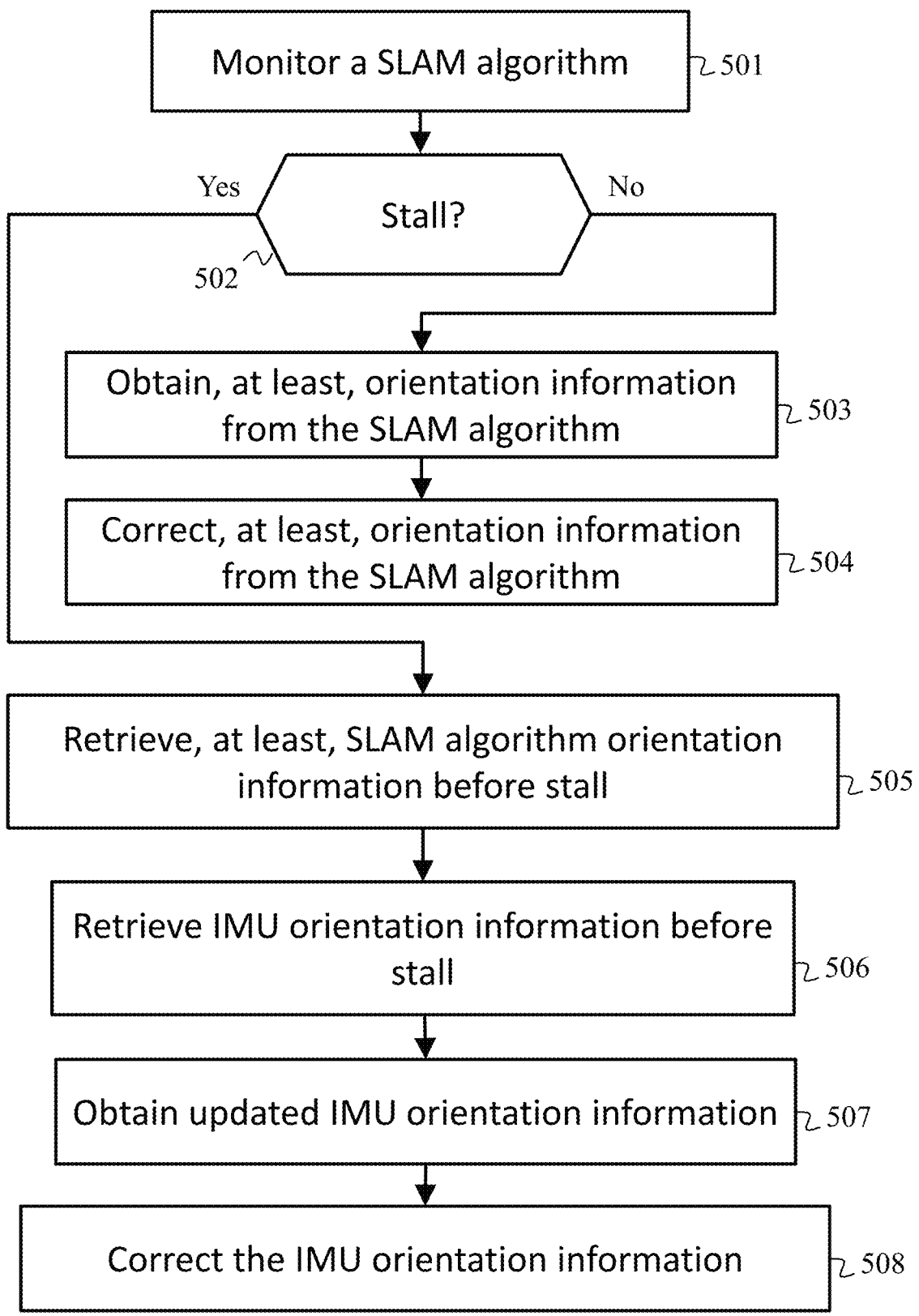
FIG. 5 schematically illustrates an algorithm for obtaining orientation information used in display management via the sighting binoculars.

FIG. 5 schematically illustrates an algorithm for obtaining orientation information used in display management via the sighting binoculars (HMD) 120. The algorithm of FIG. 5 is one particular embodiment of step 403 with regard to the retrieval, for each video frame captured by the camera 8, of the applicable orientation and possibly position information.

In a step 501, the sighting binoculars (HMD) 120 monitor the SLAM algorithm. As already indicated, the SLAM algorithm provides information on the orientation and (geographical) position of the camera 8, and therefore more generally of the line of sight of the sighting binoculars (HMD) 120. The SLAM algorithm also provides information representative of a stall or lack of stall of the SLAM algorithm According to one example, the SLAM algorithm manages a flag indicating whether the SLAM algorithm has stalled (e.g., flag at the value "1" or at the Boolean value "yes") or not stalled (e.g., flag at the value "0" or at the Boolean value "no"). According to another example, the SLAM algorithm provides a confidence index associated with the orientation and position information. The value of this confidence index depends on a number of references that the SLAM algorithm has managed to detect in the video frames captured by the camera 8 to locate itself in space. When the confidence index is below a predefined threshold, the SLAM algorithm indicates that it has stalled; otherwise, the orientation and position information from the SLAM algorithm is considered to be reliable. The sighting binoculars (HMD) 120 may also compare the confidence index with a pair of thresholds (high and low) in order to implement a hysteresis principle.

In a step 502, the sighting binoculars (HMD) 120 check whether or not the SLAM algorithm has stalled. When the SLAM algorithm has stalled, a step 505 is performed; otherwise, a step 503 is performed.

In step 503, the sighting binoculars (HMD) 120 obtain the orientation information from the SLAM algorithm.

Next, in a step 504, the sighting binoculars (HMD) 120 correct the orientation information from the SLAM algorithm in accordance with the result of the calibration operations. As described with reference to FIG. 4, this corrected orientation information is used to request, from the simulation platform (SIMP) 130, the elements to be displayed in the virtual scene. The algorithm of FIG. 5 is then ended.

In step 505, the sighting binoculars (HMD) 120 obtain the orientation information from the SLAM algorithm before stalling. Typically, the sighting binoculars (HMD) 120 store in memory the orientation information from the SLAM algorithm upon each video frame captured by the camera 8, overwriting the previously stored orientation information, for as long as the SLAM algorithm has not stalled. When the SLAM algorithm stalls, the sighting binoculars (HMD) 120 retrieve from memory the last orientation information thus stored, in order to obtain the orientation information from the SLAM algorithm before stalling.

Next, in a step 506, the sighting binoculars (HMD) 120 obtain the orientation information from the sensor of inertial measurement unit (IMU) type before stalling of the SLAM algorithm Typically, the sighting binoculars (HMD) 120 store in memory the orientation information from the sensor of inertial measurement unit (IMU) type upon each video frame captured by the camera 8, overwriting the previously stored orientation information. When the SLAM algorithm stalls, the sighting binoculars (HMD) 120 retrieve from memory the last orientation information thus stored, in order to obtain the orientation information from the sensor of inertial measurement unit (IMU) type before stalling of the SLAM algorithm.

In a step 507, the sighting binoculars (HMD) 120 obtain the updated orientation information from the sensor of inertial measurement unit (IMU) type.

In a step 504, the sighting binoculars (HMD) 120 correct the updated orientation information from the sensor of inertial measurement unit (IMU) type in accordance with the result of the calibration operations, and by adjusting it by the difference between the orientation information from the sensor of inertial measurement unit (IMU) type before stalling of the SLAM algorithm and the orientation information from the SLAM algorithm before stalling.

In one particular embodiment, the sighting binoculars (HMD) 120 correct the updated orientation information from the sensor of inertial measurement unit (IMU) type in the following way:

$$Q_{abs}(t) = Q_{abs}(t0) * Q_{imu-1}(t0) * Q_{imu}(t)$$

where:

Qabs(t) represents the corrected orientation information;

Qabs(t0) represents the absolute orientation information, that is to say, originating from the SLAM algorithm, before stalling;

Qimu(t) represents the updated orientation information from the sensor of inertial measurement unit (IMU) type; and Qimu(t0) represents the orientation information from the sensor of inertial measurement unit (IMU) type before stalling of the SLAM algorithm, and where the orientation information is represented in the form of quaternions representative of the Euler angles after correction, for the SLAM algorithm, of the deviations revealed by the calibration operations.

Reference may be made to the indications provided in the following link to convert the Euler angles into quaternions:
https://en.wikipedia.org/wiki/Conversion_between_quaternions_and_Euler_angles This corrected orientation information is then used to request, from the simulation platform (SIMP) 130, the elements to be displayed in the virtual scene. The algorithm of FIG. 5 is then ended.

The Euler angles provided by the SLAM algorithm may be provided in a relative manner, that is to say, by difference with respect to a previous value (for example by difference with respect to the first video frame used by the SLAM algorithm) The position information provided by the SLAM algorithm may also be provided in a relative manner (thereby giving translation information). It may therefore be necessary to carry out preliminary calibration operations, as described below, in order to accurately determine absolute position and orientation references of the camera 8 before applying the relative orientation and translation information provided by the SLAM algorithm.

In one particular embodiment, when the SLAM algorithm has stalled, the sighting binoculars (HMD) 120 rely on the GPS receiver to obtain position (geolocation) information for the sighting binoculars (HMD) 120, as described above; otherwise, the sighting binoculars (HMD) 120 rely on the SLAM algorithm to furthermore obtain the position information for the sighting binoculars (HMD) 120 (be this relative to a previous value or in an absolute manner).

FIG. 6 schematically illustrates offsets to be taken into consideration for calibration of the display via the sighting binoculars (HMD) 120. FIG. 6 shows a representation of terrain 600 in a side view, where two cameras 601 and 602 are placed, where the camera 601 corresponds to the camera 8 and the camera 602 corresponds to the virtual camera. The geographical positions of the cameras 601 and 602 coincide, but the camera 602 may have a lateral deviation (heading deviation) $\Delta H$, an inclination deviation (pitch deviation) $\Delta\theta$ and a vertical deviation $\Delta V$ or altitude deviation with respect to the camera 601. The right-hand part of FIG. 6 shows a two-dimensional rendering 620 of the superimposition of the video frames from the cameras 601 and 602, through projection onto a plane 630. One and the same object 610, geographically located at a distance D from the geographical position of the cameras 601 and 602, is represented there by an object 611 in the real scene and by an object 612 in the virtual scene, respectively obtained through projection of the object 610 onto a camera projection plane 631 and onto a camera projection plane 632. When the position and the orientation of the virtual camera are perfectly synchronized and coincident with the camera 8, the objects 611 and 612 are coincident.

The referencing deviations between the real scene, as captured by the camera 8, and the virtual scene, as generated by the sighting binoculars (HMD) 120 and the simulation platform (SIMP) 130, may thus be determined through trigonometry, in order to be corrected, as described below, during the training simulation.

Figure 7:
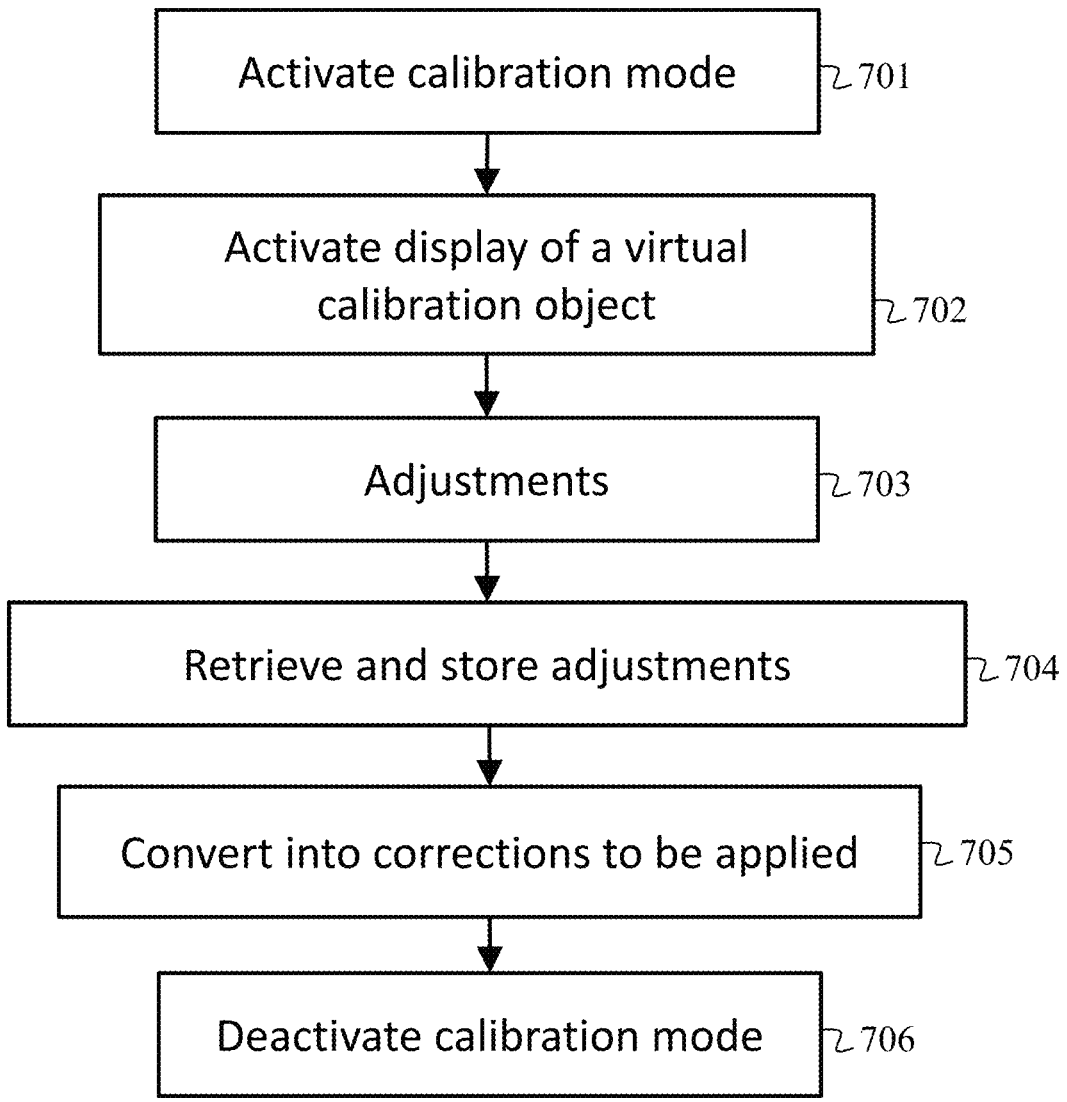
FIG. 7 schematically illustrates an algorithm for calibrating the display via the sighting binoculars.

FIG. 7 schematically illustrates an algorithm for calibrating the display via the sighting binoculars (HMD) 120.

In a step 701, the sighting binoculars (HMD) 120 activate a calibration mode. The calibration mode is, for example, activated by pressing the button 4. According to another example, the calibration mode is activated through reception of a message from the simulation platform (SIMP) 130 or from the simulator of a system of ROVER type 140. As a variant, the message may come from any other device external to the sighting binoculars (HMD) 120 and capable of communicating with the sighting binoculars (HMD) 120.

In a step 702, the sighting binoculars (HMD) 120 ask the simulation platform (SIMP) 130 to receive data allowing the display of a virtual object that serves as a calibration target. This virtual object is placed in the virtual scenario on a noteworthy position of the real scene (in front of a tree or a post for example). Initially, since the calibration has not yet been performed, the virtual object is displayed at the incorrect location on the real image from the camera 8.

In a step 703, adjustments are made in order to perform the calibration. To this end, the main trainee sights this virtual object with the sighting binoculars (HMD) 120, then presses a button (calibration button) on the sighting binoculars (HMD) 120. Sighting the virtual object is tantamount to placing the virtual object on the line of sight of the sighting binoculars (HMD) 120, with the aid, in particular, of the simulated reticles. The sighting binoculars (HMD) 120 then obtain first orientation information for the camera 8 when a first press on the calibration button of the sighting binoculars (HMD) 120 is carried out. The sighting binoculars (HMD) 120 then store the orientation of this sight that is not yet corrected by the calibration. Next, the main trainee, with the sighting binoculars (HMD) 120, in the real scene, sights the desired noteworthy position for this virtual object (defined in the virtual scenario), then presses a button on the sighting binoculars (HMD) 120. The sighting binoculars (HMD) 120 then obtain second orientation information for the camera 8 when a second press on the calibration button of the sighting binoculars (HMD) 120 is carried out. The sighting binoculars (HMD) 120 then store the orientation of this sight, which corresponds to the orientation after application of the calibration correction. The sighting binoculars (HMD) 120 may then compare the first orientation information and the second orientation information and deduce corresponding orientation and altitude information deviations therefrom.

In one variant embodiment, the adjustments are made by gradually compensating for the deviations (e.g., angular ones) observed between the position of the virtual target and its real position visible in the view captured by the camera 8. The gradual compensation is carried out by virtue of commands from the sighting binoculars (HMD) 120, for example by rotating electromechanical wheels. For example, a first electromechanical wheel makes it possible to vary the lateral deviation $\Delta H$ and a second electromechanical wheel makes it possible to vary the vertical deviation $\Delta V$, this indirectly having an impact on the inclination deviation $\Delta\theta$. When the virtual calibration target coincides with the real calibration target, the calibration adjustments are made.

In a step 704, the sighting binoculars (HMD) 120 store the adjustments made in step 703.

In a step 705, the sighting binoculars (HMD) 120 convert the adjustments into a corresponding orientation and altitude information offset. For example, the sighting binoculars (HMD) 120 determine the lateral deviation ΔH to be applied by difference between the yaw angle (heading) extracted from the first orientation information and the yaw angle (heading) extracted from the second orientation information obtained successively in step 703.

According to another example, the sighting binoculars (HMD) 120 determine the vertical deviation ΔV to be applied by virtue of a trigonometric formula using the pitch angle extracted from the first orientation information and the pitch angle extracted from the second orientation information obtained successively in step 703. Indeed, by geometric construction as shown in FIG. 6, the pitch angle extracted from the first orientation information is the angle θ2 and the pitch angle extracted from the second orientation information is the angle θ1. With the distance to the target D being determined through a telemetry calculation as detailed above, or set by configuration in the system, it is possible to deduce therefrom the value of the deviation between the real altitude of the camera 8 and the altitude of the camera in the virtual scene using the following formula:

$$\Delta V = (\tan \theta 1 - \tan \theta 2) * D$$

In a step 706, the sighting binoculars (HMD) 120 deactivate the calibration mode. Only the vertical deviation ΔV and the lateral deviation ΔH are then taken into consideration to determine the position and the orientation of the camera 8 and of the virtual camera of the sighting binoculars (HMD) 120 in an absolute manner, such that they are coincident, and thus allow the generated images of the virtual scene to be perfectly synchronized and superimposed with the video frames of the real scene filmed by the camera 8.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. Simulation sighting binoculars comprising a camera, a screen, a pair of lenses which are arranged to face the screen, and electronic circuitry which is configured to:
    obtain a video frame from the camera, the video frame being intended to be displayed by the simulation sighting binoculars in a projection window E3;
    obtain geolocation information for the simulation sighting binoculars and orientation information for the camera;
    transmit the geolocation and orientation information to a simulation platform;
    receive simulation graphical elements and spatial positioning information for three-dimensional virtual objects corresponding to the simulation graphical elements;
    carry out a two-dimensional rendering of the virtual objects depending on the positioning information, in order to display the virtual objects in a projection window E2, and, when a magnification factor is to be applied, keep dimensions of the projection window E2 fixed and adjust a field of view of the two-dimensional rendering according to the magnification factor;
    superimpose, in a virtual scene which is local to the simulation sighting binoculars, the two-dimensional rendering of the virtual objects in the projection window E2 and the video frames in the projection window E3, the projection window E3 being placed in a plane which is farther from the simulation sighting binoculars than the one where the projection window E2 is placed in a field of view of the simulation sighting binoculars, the simulation sighting binoculars having a line of sight which passes through a center of the projection windows E2 and E3, and, when the magnification factor is to be applied, adjust dimensions of the projection window E3 according to the magnification factor;
    obtain a mixed-reality stereoscopic image from superimposing the planes using a pair of virtual cameras reproducing binocular vision; and
    carry out, on the screen, a right-eye and left-eye display of the obtained mixed-reality stereoscopic image.

2. The simulation sighting binoculars as claimed in claim 1, wherein the electronic circuitry is configured to:
    further superimpose, in the virtual scene which is local to the simulation sighting binoculars, a reticle in a projection window E1 placed in a plane which is closer to the simulation sighting binoculars than the one where the projection window E2 is placed in the field of view of the simulation sighting binoculars, the line of sight also passing through a center of the projection window E1, and, when a magnification factor is to be applied, adjust the dimensions of the projection window E1 according to the magnification factor.

3. The simulation sighting binoculars as claimed in claim 1, wherein the electronic circuitry is configured to further superimpose, in the virtual scene which is local to the simulation sighting binoculars, additional information in a projection window E0 placed in a plane which is closer to the simulation sighting binoculars than the one where the projection window E1 is placed in the field of view of the simulation sighting binoculars, the projection window E0 not being sensitive to the magnification factor.

4. The simulation sighting binoculars as claimed in claim 1, wherein the screen, the camera and the electronic circuitry are provided by a smart mobile telephone joined to a housing comprising the pair of lenses, which are arranged to face the screen of the smart mobile telephone.

5. The simulation sighting binoculars as claimed in claim 1, further comprising a sensor of inertial measurement unit type, and wherein the electronic circuitry implements a Simultaneous Localization and Mapping algorithm, and the orientation information for the camera is provided by the Simultaneous Localization and Mapping algorithm, except when the Simultaneous Localization and Mapping algorithm stalls, in which case the orientation information for the camera is provided by the sensor of inertial measurement unit type.

6. The simulation sighting binoculars as claimed in claim 5, wherein the Simultaneous Localization and Mapping algorithm provides a confidence index associated with the orientation information for the camera, for each video frame captured by the camera, and the electronic circuitry is configured to determine whether the Simultaneous Localization and Mapping algorithm has stalled according to a value of the confidence index.

7. The simulation sighting binoculars as claimed in claim 5, wherein, when the Simultaneous Localization and Mapping algorithm has stalled, the electronic circuitry corrects the updated orientation information from the sensor of inertial measurement unit type in the following way:

$$Q_{abs}(t)=Q_{abs}(t0)*Q_{imu}^{-1}(t0)*Q_{imu}(t)$$

where:
- $Q_{abs}(t)$ represents corrected orientation information;
- $Q_{abs}(t0)$ represents absolute orientation information originating from the Simultaneous Localization and Mapping algorithm, before stalling;
- $Q_{imu}(t)$ represents updated orientation information from the sensor of inertial measurement unit type; and
- $Q_{imu}(t0)$ represents orientation information from the sensor of inertial measurement unit type before stalling of the Simultaneous Localization and Mapping algorithm.

8. The simulation sighting binoculars as claimed in claim 5, wherein the electronic circuitry corrects the orientation information provided by the Simultaneous Localization and Mapping algorithm according to deviations determined during calibration operations.

9. The simulation sighting binoculars as claimed in claim 8 wherein the electronic circuitry is configured to, during the calibration operations:
- receive simulation graphical elements corresponding to a calibration virtual object and spatial positioning information for the calibration virtual object;
- carry out, on the screen, a right-eye and left-eye stereoscopic display of a mixed-reality stereoscopic image including the calibration virtual object;
- obtain first orientation information for the camera when a first press on a calibration button of the simulation sighting binoculars is carried out;
- obtain second orientation information for the camera when a second press on the calibration button of the simulation sighting binoculars is carried out; and
- compare the first orientation information and the second orientation information and deduce therefrom corresponding orientation and altitude information deviations.

10. The simulation sighting binoculars as claimed in claim 5, wherein the geolocation information for the simulation sighting binoculars is provided by the Simultaneous Localization and Mapping algorithm, except when the Simultaneous Localization and Mapping algorithm stalls, in which case the geolocation information for the simulation sighting binoculars is provided by a GPS receiver integrated into the simulation sighting binoculars.

11. A simulation system comprising a simulation platform, as well as simulation sighting binoculars as claimed in claim 1, the simulation platform comprising electronic circuitry configured to place, according to a training scenario, virtual objects in a digital terrain model modeling a training ground where the simulation sighting binoculars are intended to be used, and to transmit or cause to be transmitted, to the simulation sighting binoculars, the simulation graphical elements according to the geolocation information for the simulation sighting binoculars and the orientation information for the camera which is transmitted by the simulation sighting binoculars.

12. The simulation system as claimed in claim 11, wherein the simulation platform transmits or causes to be transmitted, to the simulation sighting binoculars, the simulation graphical elements asynchronously with respect to the geolocation information for the simulation sighting binoculars and to the orientation information for the camera, the simulation sighting binoculars carry out interpolations of the positioning of the virtual objects and a first processing unit of the simulation system, which is remote from the simulation sighting binoculars, carries out, on behalf of the simulation sighting binoculars, a positioning adjustment by virtue of the digital terrain model.

13. The simulation system as claimed in claim 11, wherein, when the simulation sighting binoculars activate a telemetry reading, a second processing unit of the simulation system, which is remote from the simulation sighting binoculars, carries out a distance calculation with respect to a target sighted by the simulation sighting binoculars using a ray tracing method in a virtual scene including the virtual objects and the digital terrain model.

14. A simulation method, implemented by electronic circuitry of simulation sighting binoculars further comprising a camera, a screen and a pair of lenses which are arranged to face the screen, the method comprising the following steps:
- obtaining a video frame from the camera, the video frame being intended to be displayed by the simulation sighting binoculars in a projection window E3;
- obtaining geolocation information for the simulation sighting binoculars and orientation information for the camera;
- transmitting the geolocation and orientation information to a simulation platform;
- receiving simulation graphical elements and spatial positioning information for three-dimensional virtual objects corresponding to the simulation graphical elements;
- carrying out a two-dimensional rendering of the virtual objects depending on the spatial positioning information, in order to display the virtual objects in a projection window E2, and, when a magnification factor is to be applied, keeping dimensions of the projection window E2 fixed and adjusting a field of view of the two-dimensional rendering according to the magnification factor;
- superimposing, in a virtual scene which is local to the simulation sighting binoculars, the two-dimensional rendering of the virtual objects in the projection window E2 and the video frames in the projection window E3, the projection window E3 being placed in a plane which is farther from the simulation sighting binoculars than the one where the projection window E2 is placed in the field of view of the simulation sighting binoculars, the simulation sighting binoculars having a line of sight which passes through a center of the projection windows E2 and E3, and, when the magnification factor is to be applied, adjusting the dimensions of the projection window E3 according to the magnification factor;
- obtaining a mixed-reality stereoscopic image from superimposing the planes using a pair of virtual cameras reproducing binocular vision which is adapted to the pair of lenses; and
- carrying out, on the screen, a right-eye and left-eye display of the obtained mixed-reality stereoscopic image.

15. A simulation method, implemented by a simulation system including simulation sighting binoculars implementing the simulation method as claimed in claim 14 and a simulation platform comprising electronic circuitry, implementing the following steps:

placing, according to a training scenario, virtual objects in a three-dimensional digital terrain model modeling a training ground where the simulation sighting binoculars are used; and transmitting or causing to be transmitted, to the simulation sighting binoculars, graphical elements corresponding to the virtual objects according to the geolocation information for the simulation sighting binoculars and the orientation information for their camera which is transmitted by the simulation sighting binoculars.

16. A computer program product, comprising instructions causing a processor to execute the method as claimed in claim 14, when said instructions are executed by the processor.

\* \* \* \* \*